US009483451B2

(12) United States Patent
Frew

(10) Patent No.: US 9,483,451 B2
(45) Date of Patent: Nov. 1, 2016

(54) SYSTEM AND METHOD FOR HANDLING USER EDITING HISTORY BASED ON SPAWNING, MERGING DATA STRUCTURES OF DIRECTED ACYCLIC GRAPH

(71) Applicant: ScribeStar Ltd., London (GB)

(72) Inventor: Stephen John Frew, Woking (GB)

(73) Assignee: SCRIBESTAR LTD. (GB)

( * ) Notice: Subject to any disclaimer, the term of this patent is extended or adjusted under 35 U.S.C. 154(b) by 600 days.

(21) Appl. No.: 13/831,065

(22) Filed: Mar. 14, 2013

(65) Prior Publication Data
US 2014/0281873 A1    Sep. 18, 2014

(51) Int. Cl.
G06F 11/30    (2006.01)
G06F 17/22    (2006.01)
G06F 17/30    (2006.01)

(52) U.S. Cl.
CPC ........... G06F 17/2288 (2013.01); G06F 11/30 (2013.01); G06F 17/30 (2013.01)

(58) Field of Classification Search
CPC ........ G06F 17/30; G06F 15/00; G06F 3/033; G06F 3/041; G06F 17/227; H04B 1/38
USPC .................................. 715/256, 863; 345/173
See application file for complete search history.

(56) References Cited

U.S. PATENT DOCUMENTS

| 3,920,895 A | 11/1975 | Vieri et al. |
| 3,920,896 A | 11/1975 | Bishop et al. |
| 5,008,853 A | 4/1991 | Bly et al. |
| 5,129,082 A | 7/1992 | Tirfing et al. |
| 5,146,552 A | 9/1992 | Cassorla et al. |
| 5,204,947 A | 4/1993 | Bernstein et al. |
| 5,321,505 A | 6/1994 | Leddy |
| 5,341,469 A | 8/1994 | Rossberg et al. |
| 5,515,491 A | 5/1996 | Bates et al. |
| 5,539,871 A | 7/1996 | Gibson |
| 5,596,700 A | 1/1997 | Darnell et al. |
| 5,596,705 A | 1/1997 | Reimer et al. |
| 5,659,676 A | 8/1997 | Redpath |

(Continued)

OTHER PUBLICATIONS

Kevin Gao, "Using Visual SourceSafe", published by Dynamsoft, 2012, http://uploads.worldlibrary.net/uploads/pdf/20121122061442using_visual_sourcesafe_kevin_gao_dynamsoft_pdf.pdf.*

(Continued)

Primary Examiner — Cesar Paula
Assistant Examiner — Jian Huang
(74) Attorney, Agent, or Firm — Morgan, Lewis & Bockius LLP

(57) ABSTRACT

Methods for formatting a hierarchical data structure having structural elements ("HDS") are provided. A branch in a directed acyclic graph is spawned. The graph includes a root node and a plurality of sub-nodes respectively corresponding to master and edited versions of the HDS, respectively. An edited version of the HDS is associated with a secondary instance of the HDS, and a change set corresponding thereto. The change set includes user edits. In the method first and second change sets are obtained and, responsive to a user selection, portions thereof are merged to produce a third change set. An additional secondary instance of the HDS is generated by applying the third change set to structural elements included in the master instance of the HDS. The additional secondary instance of the HDS is associated with an edited version of the HDS which, in turn, is associated with a sub-node in the graph.

51 Claims, 8 Drawing Sheets

(56) References Cited

U.S. PATENT DOCUMENTS

| | | |
|---|---|---|
| 5,669,005 A | 9/1997 | Curbow et al. |
| 5,671,428 A | 9/1997 | Muranaga et al. |
| 5,694,544 A | 12/1997 | Tanigawa et al. |
| 5,706,452 A | 1/1998 | Ivanov |
| 5,706,502 A | 1/1998 | Foley et al. |
| 5,708,826 A | 1/1998 | Ikeda et al. |
| 5,708,845 A | 1/1998 | Wistendahl et al. |
| 5,740,444 A | 4/1998 | Frid-Nielsen |
| 5,752,055 A | 5/1998 | Redpath et al. |
| 5,758,313 A | 5/1998 | Shah et al. |
| 5,761,419 A | 6/1998 | Schwartz et al. |
| 5,761,499 A | 6/1998 | Sonderegger |
| 5,781,732 A | 7/1998 | Adams |
| 5,781,901 A | 7/1998 | Kuzma |
| 5,787,175 A | 7/1998 | Carter |
| 5,799,191 A | 8/1998 | Moriyasu et al. |
| 5,801,702 A | 9/1998 | Dolan et al. |
| 5,809,512 A | 9/1998 | Kato |
| 5,860,073 A | 1/1999 | Ferrel et al. |
| 5,864,870 A | 1/1999 | Guck |
| 5,870,754 A | 2/1999 | Dimitrova et al. |
| 5,878,421 A | 3/1999 | Ferrel et al. |
| 5,890,177 A | 3/1999 | Moody et al. |
| 5,893,126 A | 4/1999 | Drews et al. |
| 5,911,776 A | 6/1999 | Guck |
| 5,931,906 A | 8/1999 | Fidelibus, Jr. et al. |
| 5,937,066 A | 8/1999 | Gennaro et al. |
| 5,938,724 A | 8/1999 | Pommier et al. |
| 5,944,785 A | 8/1999 | Pommier et al. |
| 5,949,413 A | 9/1999 | Lerissa et al. |
| 5,950,214 A | 9/1999 | Rivette et al. |
| 5,956,736 A | 9/1999 | Hanson et al. |
| 5,958,006 A | 9/1999 | Eggleston et al. |
| 5,978,836 A | 11/1999 | Ouchi |
| 5,987,469 A | 11/1999 | Lewis et al. |
| 6,009,462 A | 12/1999 | Birrell et al. |
| 6,014,135 A | 1/2000 | Fernandes |
| 6,029,171 A | 2/2000 | Smiga et al. |
| 6,064,751 A | 5/2000 | Smithies et al. |
| 6,067,551 A | 5/2000 | Brown et al. |
| 6,088,709 A | 7/2000 | Watanabe |
| 6,119,147 A | 9/2000 | Toomey et al. |
| 6,158,903 A | 12/2000 | Schaeffer et al. |
| 6,178,431 B1 | 1/2001 | Douglas |
| 6,182,080 B1 | 1/2001 | Clements |
| 6,212,534 B1 | 4/2001 | Lo et al. |
| 6,243,722 B1 | 6/2001 | Day et al. |
| 6,275,223 B1 | 8/2001 | Hughes |
| 6,289,460 B1 | 9/2001 | Hajmiragha |
| 6,317,777 B1 | 11/2001 | Skarbo et al. |
| 6,334,141 B1 | 12/2001 | Varma et al. |
| 6,336,134 B1 | 1/2002 | Varma |
| 6,343,313 B1 | 1/2002 | Salesky et al. |
| 6,360,236 B1 | 3/2002 | Khan et al. |
| 6,363,352 B1 | 3/2002 | Dailey et al. |
| 6,411,989 B1 | 6/2002 | Anupam et al. |
| 6,502,113 B1 | 12/2002 | Crawford et al. |
| 6,560,637 B1 | 5/2003 | Dunlap et al. |
| 6,590,584 B1 | 7/2003 | Yamaura et al. |
| 6,643,663 B1 | 11/2003 | Dabney et al. |
| 6,687,878 B1 | 2/2004 | Eintracht et al. |
| 6,704,873 B1 * | 3/2004 | Underwood ............... 726/12 |
| 6,708,172 B1 | 3/2004 | Wong et al. |
| 7,251,680 B2 | 7/2007 | DeVos |
| 7,818,678 B2 | 10/2010 | Massand |
| 7,895,276 B2 | 2/2011 | Massand |
| 8,266,122 B1 * | 9/2012 | Newcombe ....... G06F 17/30309 707/695 |
| 8,448,130 B1 | 5/2013 | Pillarisetti et al. |
| 2001/0037367 A1 | 11/2001 | Iyer |
| 2002/0049786 A1 | 4/2002 | Bibliowicz et al. |
| 2002/0059107 A1 | 5/2002 | Reich |
| 2002/0059342 A1 | 5/2002 | Gupta et al. |
| 2002/0059343 A1 | 5/2002 | Kurishima et al. |
| 2002/0065848 A1 | 5/2002 | Walker et al. |
| 2002/0078088 A1 | 6/2002 | Kuruoglu et al. |
| 2002/0085030 A1 | 7/2002 | Ghani |
| 2002/0107886 A1 | 8/2002 | Gentner et al. |
| 2002/0143691 A1 | 10/2002 | Ramaley et al. |
| 2003/0112273 A1 | 6/2003 | Hadfield et al. |
| 2003/0158855 A1 | 8/2003 | Farnham et al. |
| 2003/0197730 A1 | 10/2003 | Kakuta et al. |
| 2004/0085355 A1 | 5/2004 | Harmes |
| 2004/0117337 A1 | 6/2004 | Beck |
| 2004/0205653 A1 | 10/2004 | Hadfield et al. |
| 2005/0138085 A1 * | 6/2005 | Verma et al. ............... 707/202 |
| 2005/0138541 A1 | 6/2005 | Euchner |
| 2006/0053364 A1 | 3/2006 | Hollander |
| 2006/0167879 A1 | 7/2006 | Umeki et al. |
| 2006/0237524 A1 | 10/2006 | Wentworth |
| 2006/0253482 A1 | 11/2006 | Zellweger et al. |
| 2006/0259524 A1 | 11/2006 | Horton |
| 2007/0186157 A1 | 8/2007 | Walker et al. |
| 2009/0249224 A1 | 10/2009 | Davis et al. |
| 2010/0235881 A1 | 9/2010 | Liu et al. |
| 2012/0233543 A1 | 9/2012 | Vagell |

OTHER PUBLICATIONS

U.S. Appl. No. 60/384,178, filed Jul. 2003, Swords et al.*
U.S. Appl. No. 12/350,144, filed Jan. 7, 2009.
U.S. Appl. No. 12/406,093, filed Mar. 17, 2009.
U.S. Appl. No. 12/413,486, filed Mar. 27, 2009.
"Chapter 29: Comments and Reviewing" In: Brent Heslop, David Angell, Peter Kent: "*Word 2003 Bible*", Oct. 10, 2003 (Oct. 10, 2003), Wiley Publishing Inc., Indianapolis, IN XP002736127, ISBN: 0-7645-3971-X pp. 697-715.
Anonymous: "Collaborative editing—Multiple users eidting a document simultaneously: Zoho Blogs," Jun. 12, 2006 (Jun. 12, 2006), XP055170431, retrieved from the Internet: URL:https://www.zoho.com/writer/blog/collaborative-editing-multiple-users-editing-a-document-simultaneously.html [retrieved on Feb. 18, 2015].
XP-002736127 Comments and Reviewing—Chapter 29.
International Search Report and Written Opinion—Application No. PCT/IB2014/001588 dated Jun. 11, 2015.
Office Action for U.S. Appl. No. 13/830,832, filed Mar. 14, 2013, date Sep. 9, 2015.

* cited by examiner

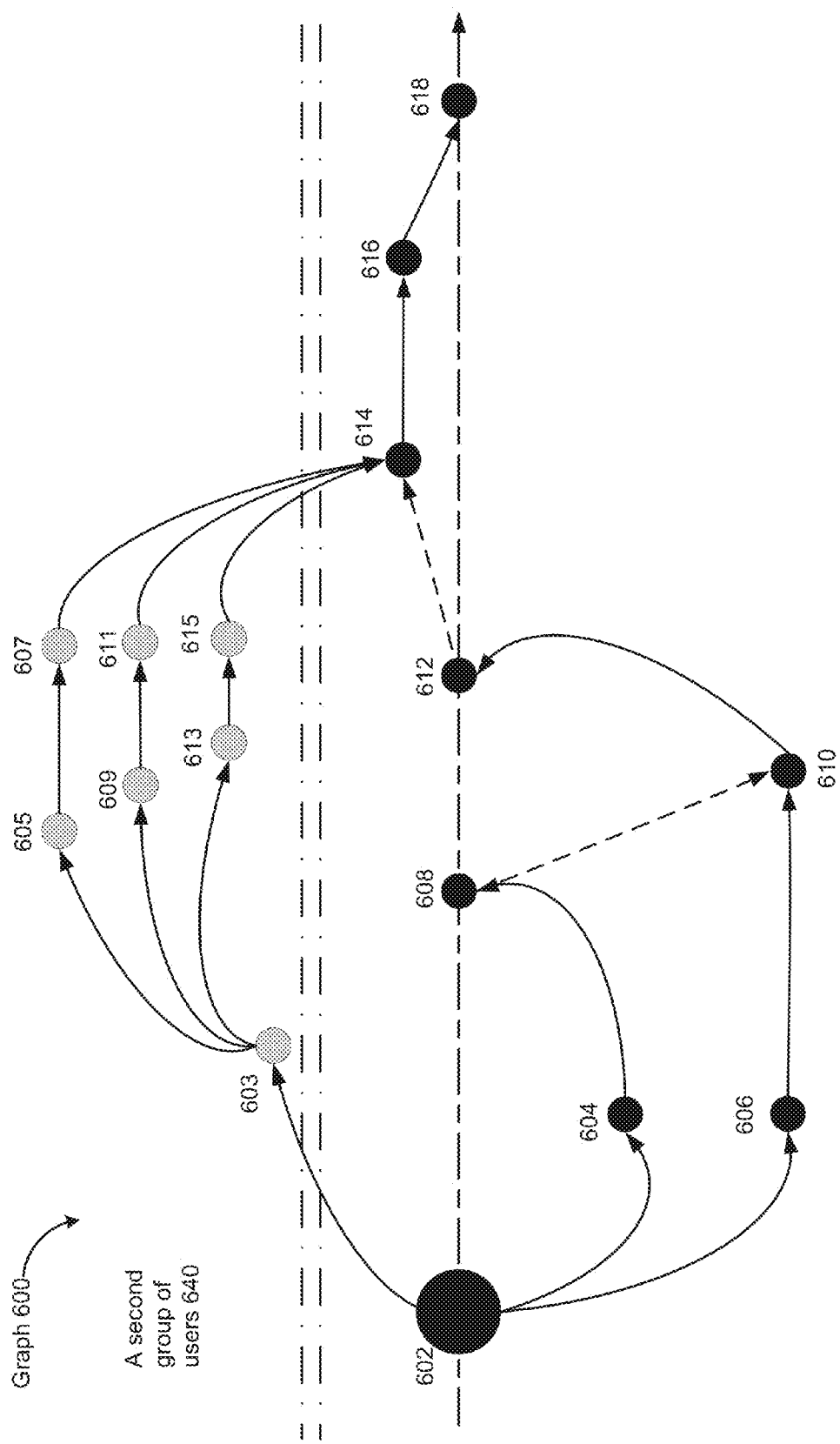

SYSTEM AND METHOD FOR HANDLING USER EDITING HISTORY BASED ON SPAWNING, MERGING DATA STRUCTURES OF DIRECTED ACYCLIC GRAPH

RELATED APPLICATIONS

This application relates to U.S. patent application Ser. No. 13/830,832, filed on Mar. 14, 2013, which is hereby incorporated by reference in its entirety.

TECHNICAL FIELD

The disclosed implementations relate generally to handling user editing history.

BACKGROUND

Reviewing or resolving edits by different users to a document can be difficult. First, it may be difficult to review, at the same time, edits by several users to the document. For example, in the same draft, edits by user A may overwrite those made by user B. Second, conflicting edits to the same portion of a document may result in confusion. For example, either the phrase "do not agree" or the phrase "disagree" can be used to express a disagreement; incorporating both phrases in a single sentence—"do not disagree"—however, results in a complete change of meaning (e.g., an agreement rather than a disagreement). Third, in some situations, legal and ethical considerations require that file history be preserved. For example, an attorney may need to preserve evidence that a settlement agreement was presented to and approved by all clients.

The above identified difficulties are reduced or eliminated by the systems and methods disclosed herein.

SUMMARY

Systems, methods, and non-transitory computer readable storage mediums for handling user editing history are disclosed herein.

In some implementations, a method for handling user editing history is disclosed. In some implementations, the method includes, at a computer system, formatting for display a hierarchical data structure associated with a transaction. The hierarchical data structure comprises a plurality of structural elements. In some implementations, the method also includes spawning a branch in a directed acyclic graph. The directed acyclic graph includes: (a) a root node corresponding to a master instance of the hierarchical data structure, and (b) a plurality of sub-nodes corresponding to a plurality of edited versions of the hierarchical data structure. A respective edited version in the plurality of edited versions of the hierarchical data structure is associated with (a) a respective secondary instance of the hierarchical data structure, and (b) a respective change set corresponding to the secondary instance. The respective change set includes one or more edits, by a user associated with the respective edited version, to the hierarchical data structure.

In some implementations, the method also includes obtaining (a) a first change set associated with a first edited version of the hierarchical data structure, and (b) a second change set associated with a second edited version of the hierarchical data structure. The first change set is associated with a first user and the second change set is associated with a second user.

In some implementations, the method further includes responsive to a predefined user selection, merging a portion of the first change set with a portion of the second change set to produce a third change set; generating a secondary instance of the hierarchical data structure by applying one or more edits included in the third change set to the plurality of structural elements included in the master instance of the hierarchical data structure; associating the secondary instance of the hierarchical data structure with an edited version of the hierarchical data structure; and associating the edited version in the plurality of edited versions with a sub-node in the directed acyclic graph.

In some implementations, the first user and the second user have competing or adverse interest in the transaction.

In some implementations, the first user has access to both the first and the second change sets, but the second user has access to the second change set, but not to the first change set.

In some implementations, the first user and the second user are users working on the same side of the transaction.

In some implementations, the predefined user selection is made by a third user having responsibility of approving edits by the first or the second user.

In some implementations, merging the portion of the first change set with the portion of the second change set includes: (i) if the merging does not result in a conflict, merging, without user intervention, the portion of the first change set with the portion of the second change set; and (ii) if the merging does result in a conflict between edits in the portion of the first change set and the edits in the portion of the second change set, requesting a user to resolve the conflict.

In some implementations, merging the portion of the first change set with the portion of the second change set includes (i) if the merging does not result in a change of semantics of the hierarchical data structure, merging, without user intervention, the portion of the first change set with the portion of the second change set; and (ii) if the merging does result in a change of semantics of the hierarchical data structure, requesting a user to accept or reject the change of semantics.

In some implementations, the transaction includes one of: an IPO transaction, a merger or acquisition transaction, a rights issue transaction, a debt issuance transaction, or a security related transaction.

In some implementations, the content of the master instance of the hierarchical data structure does not change.

In some implementations, the hierarchical data structure further includes one or more sections. Each section in the one or more sections includes one or more structural elements in the plurality of structural elements.

In some implementations, a respective structural element in the plurality of structural elements corresponds to a paragraph having one or more text or non-text elements in the hierarchical data structure.

In some implementations, applying one or more edits included in the third change set to the plurality of structural elements included in the master instance of the hierarchical data structure includes: incorporating, into the hierarchical data structure, some, but not all, edits in the one or more edits.

In some implementations, the secondary instance of the hierarchical data structure is associated with a compliance checklist. The compliance checklist includes one or more compliance items associated with a portion of the secondary instance of the hierarchical data structure. The one or more compliance items correspond to one or more requirements that need to be fulfilled before completing the transaction.

In some implementations, the method also includes updating, without user intervention, the compliance checklist in accordance with a change to the portion of the secondary instance of the hierarchical data structure.

In some implementations, the secondary instance of the hierarchical data structure is associated with a verification checklist. The verification checklist includes information identifying one or more documents associated with a portion of the secondary instance of the hierarchical data structure. The one or more documents verify, to the best of knowledge of a user, the portions of the hierarchical data structure.

In some implementations, the verification includes in accordance with a determination that a respective portion of the one or more portions of the hierarchical data structure constitutes an assertion of fact or is based on an explicit or implicit assumption of fact, confirming accuracy of the assertion or the assumption of fact using the first document.

In some implementations, the method also includes updating, without user intervention, the verification checklist in accordance with a change to the portion of the secondary instance of the hierarchical data structure.

In some implementations, a computer system for handling user editing history is provided. The system includes one or more processors, and a memory storing one or more programs for execution by the one or more processors. The one or more programs include instructions for formatting for display a hierarchical data structure associated with a transaction. The hierarchical data structure comprises a plurality of structural elements. The one or more programs also include instructions for spawning a branch in a directed acyclic graph. The directed acyclic graph includes: (a) a root node corresponding to a master instance of the hierarchical data structure, and (b) a plurality of sub-nodes corresponding to a plurality of edited versions of the hierarchical data structure. A respective edited version in the plurality of edited versions of the hierarchical data structure is associated with (a) a respective secondary instance of the hierarchical data structure, and (b) a respective change set corresponding to the secondary instance. The respective change set includes one or more edits, by a user associated with the respective edited version, to the hierarchical data structure. In some implementations, the one or more programs also include instructions for obtaining (a) a first change set associated with a first edited version of the hierarchical data structure, and (b) a second change set associated with a second edited version of the hierarchical data structure. The first change set is associated with a first user and the second change set is associated with a second user. In some implementations, the one or more programs also include instructions for responsive to a predefined user selection: merging a portion of the first change set with a portion of the second change set to produce a third change set; generating a secondary instance of the hierarchical data structure by applying one or more edits included in the third change set to the plurality of structural elements included in the master instance of the hierarchical data structure; associating the secondary instance of the hierarchical data structure with an edited version of the hierarchical data structure; and associating the edited version in the plurality of edited versions with a sub-node in the directed acyclic graph.

In some implementations, the first user and the second user have competing or adverse interest in the transaction.

In some implementations, the first user has access to both the first and the second change sets, but the second user has access to the second change set, but not to the first change set.

In some implementations, the first user and the second user are users working on the same side of the transaction.

In some implementations, the predefined user selection is made by a third user having responsibility of approving edits by the first or the second user.

In some implementations, the instructions for merging the portion of the first change set with the portion of the second change set include instructions for (i) if the merging does not result in a conflict, merging, without user intervention, the portion of the first change set with the portion of the second change set; and instructions for (ii) if the merging does result in a conflict between edits in the portion of the first change set and the edits in the portion of the second change set, requesting a user to resolve the conflict.

In some implementations, the instructions for merging the portion of the first change set with the portion of the second change set include instructions for (i) if the merging does not result in a change of semantics of the hierarchical data structure, merging, without user intervention, the portion of the first change set with the portion of the second change set; and instructions for (ii) if the merging does result in a change of semantics of the hierarchical data structure, requesting a user to accept or reject the change of semantics.

In some implementations, the transaction includes one of: an IPO transaction, a merger or acquisition transaction, a rights issue transaction, a debt issuance transaction, or a security related transaction.

In some implementations, the content of the master instance of the hierarchical data structure does not change.

In some implementations, the hierarchical data structure further includes one or more sections. Each section in the one or more sections includes one or more structural elements in the plurality of structural elements.

In some implementations, a respective structural element in the plurality of structural element corresponds to a paragraph having one or more text or non-text elements in the hierarchical data structure.

In some implementations, the instructions for applying one or more edits included in the third change set to the plurality of structural elements included in the master instance of the hierarchical data structure include instructions: for incorporating, into the hierarchical data structure, some, but not all, edits in the one or more edits.

In some implementations, the secondary instance of the hierarchical data structure is associated with a compliance checklist. The compliance checklist includes one or more compliance items associated with a portion of the secondary instance of the hierarchical data structure. The one or more compliance items correspond to one or more requirements that need to be fulfilled before completing the transaction.

In some implementations, the one or more programs further comprise instructions for: updating, without user intervention, the compliance checklist in accordance with a change to the portion of the secondary instance of the hierarchical data structure.

In some implementations, the secondary instance of the hierarchical data structure is associated with a verification checklist. The verification checklist includes information identifying one or more documents associated with a portion of the secondary instance of the hierarchical data structure. The one or more documents verify, to the best of knowledge of a user, the portions of the hierarchical data structure.

In some implementations, the verification includes in accordance with a determination that a respective portion of the one or more portions of the hierarchical data structure constitutes an assertion of fact or is based on an explicit or implicit assumption of fact, confirming accuracy of the assertion or the assumption of fact using the first document.

In some implementations, the one or more programs further include instructions for: updating, without user intervention, the verification checklist in accordance with a change to the portion of the secondary instance of the hierarchical data structure.

A non-transitory computer readable storage medium storing instructions for handling user editing history is provided. In some implementations, the non-transitory computer readable storage medium stores one or more programs for execution by the one or more processors of a computer system. The one or more programs include instructions for formatting for display a hierarchical data structure associated with a transaction. The hierarchical data structure comprises a plurality of structural elements. In some implementations, the one or more programs also include instructions for spawning a branch in a directed acyclic graph. The directed acyclic graph includes: (a) a root node corresponding to a master instance of the hierarchical data structure, and (b) a plurality of sub-nodes corresponding to a plurality of edited versions of the hierarchical data structure. A respective edited version in the plurality of edited versions of the hierarchical data structure is associated with (a) a respective secondary instance of the hierarchical data structure, and (b) a respective change set corresponding to the secondary instance. The respective change set includes one or more edits, by a user associated with the respective edited version, to the hierarchical data structure. In some implementations, the one or more programs also include instructions for obtaining (a) a first change set associated with a first edited version of the hierarchical data structure, and (b) a second change set associated with a second edited version of the hierarchical data structure. The first change set is associated with a first user and the second change set is associated with a second user. In some implementations, the one or more programs also include instructions for responsive to a predefined user selection, merging a portion of the first change set with a portion of the second change set to produce a third change set; generating a secondary instance of the hierarchical data structure by applying one or more edits included in the third change set to the plurality of structural elements included in the master instance of the hierarchical data structure; associating the secondary instance of the hierarchical data structure with an edited version of the hierarchical data structure; and associating the edited version in the plurality of edited versions with a sub-node in the directed acyclic graph.

In some implementations, the first user and the second user have competing or adverse interest in the transaction.

In some implementations, the first user has access to both the first and the second change sets, but the second user has access to the second change set, but not to the first change set.

In some implementations, the first user and the second user are users working on the same side of the transaction.

In some implementations, the predefined user selection is made by a third user having responsibility of approving edits by the first or the second user.

In some implementations, the instructions for merging the portion of the first change set with the portion of the second change set include instructions for (i) if the merging does not result in a conflict, merging, without user intervention, the portion of the first change set with the portion of the second change set; and instructions for (ii) if the merging does result in a conflict between edits in the portion of the first change set and the edits in the portion of the second change set, requesting a user to resolve the conflict.

In some implementations, the instructions for merging the portion of the first change set with the portion of the second change set include instructions for (i) if the merging does not result in a change of semantics of the hierarchical data structure, merging, without user intervention, the portion of the first change set with the portion of the second change set; and instructions for (ii) if the merging does result in a change of semantics of the hierarchical data structure, requesting a user to accept or reject the change of semantics.

In some implementations, the transaction includes one of: an IPO transaction, a merger or acquisition transaction, a rights issue transaction, a debt issuance transaction, or a security related transaction.

In some implementations, the content of the master instance of the hierarchical data structure does not change.

In some implementations, the hierarchical data structure further includes one or more sections. Each section in the one or more sections includes one or more structural elements in the plurality of structural elements.

In some implementations, a respective structural element in the plurality of structural element corresponds to a paragraph having one or more text or non-text elements in the hierarchical data structure.

In some implementations, the instructions for applying one or more edits included in the third change set to the plurality of structural elements included in the master instance of the hierarchical data structure include instructions for incorporating, into the hierarchical data structure, some, but not all, edits in the one or more edits.

In some implementations, the secondary instance of the hierarchical data structure is associated with a compliance checklist. The compliance checklist includes one or more compliance items associated with a portion of the secondary instance of the hierarchical data structure. The one or more compliance items correspond to one or more requirements that need to be fulfilled before completing the transaction.

In some implementations, the one or more programs further comprise instructions for updating, without user intervention, the compliance checklist in accordance with a change to the portion of the secondary instance of the hierarchical data structure.

In some implementations, the secondary instance of the hierarchical data structure is associated with a verification checklist. The verification checklist includes information identifying one or more documents associated with a portion of the secondary instance of the hierarchical data structure. The one or more documents verify, to the best of knowledge of a user, the portions of the hierarchical data structure.

In some implementations, the verification includes in accordance with a determination that a respective portion of the one or more portions of the hierarchical data structure constitutes an assertion of fact or is based on an explicit or implicit assumption of fact, confirming accuracy of the assertion or the assumption of fact using the first document.

In some implementations, the one or more programs further include instructions for: updating, without user intervention, the verification checklist in accordance with a change to the portion of the secondary instance of the hierarchical data structure.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIG. 6 is a diagram illustrating an example graph structure, in accordance with some implementations.

DETAILED DESCRIPTION

The implementations described herein provide techniques for handling user editing history. These techniques may significantly increase efficiency in preparing and reviewing draft legal documents (e.g., SEC, EPA, or IRS filings, complaints, and motions).

For example, while reviewing a draft stock prospectus, a reviewer (e.g., a law firm partner) can obtain both a first set of edits to the draft prospectus by user A (e.g., a junior associate attorney), and a second set of edits to the draft prospectus by user B (e.g., a senior associate attorney). After reviewing these two sets of edits, the reviewer selectively incorporates a portion of the first and second sets of edits into the draft prospectus to produce a new draft (e.g., a newer version of the draft prospectus). Sometimes, in producing the new draft, the reviewer also makes his own edits to the draft in addition to those included in the first or second sets.

When the reviewer finishes reviewing the draft, a graph structure (e.g., the graph 600 in FIG. 6) is modified to reflect the creation of the new draft. As such, a sub-node corresponding to the new draft is added to the graph and the edits made by the reviewer (e.g., edits made by the reviewer herself or those suggested by the users A or B) in producing the new draft are recorded in a change set, which is also associated with the new sub-node.

In some cases, each time a new draft is created, it is identified, using a graph, as related to a previous (e.g., the preceding) draft of the same document, and changes (e.g., edits) between a previous (e.g., the preceding) draft and the new draft are recorded in a change set.

In these ways, using a graph, several drafts (or versions) of the same documents are identified as related. For example, a current draft is related to a previous draft when there is an edge connecting the node representing the current draft and the node representing the previous draft. Also in these ways, differences between several drafts (or versions) of the same documents are reflected (e.g., recorded) in one or more change sets.

These approaches are advantageous. First, all drafts (or versions) of the same documents are identified as related in a graph, enabling a user to review differences between any two given drafts (rather than only between a draft and its immediate predecessor). Second, file editing history is preserved (using change sets), enabling a user to readily identify which users had access or made changes to the document, and to roll back to any given previous draft when necessary.

Additional details of implementations are now described in relation to the Figures.

Figure 1:
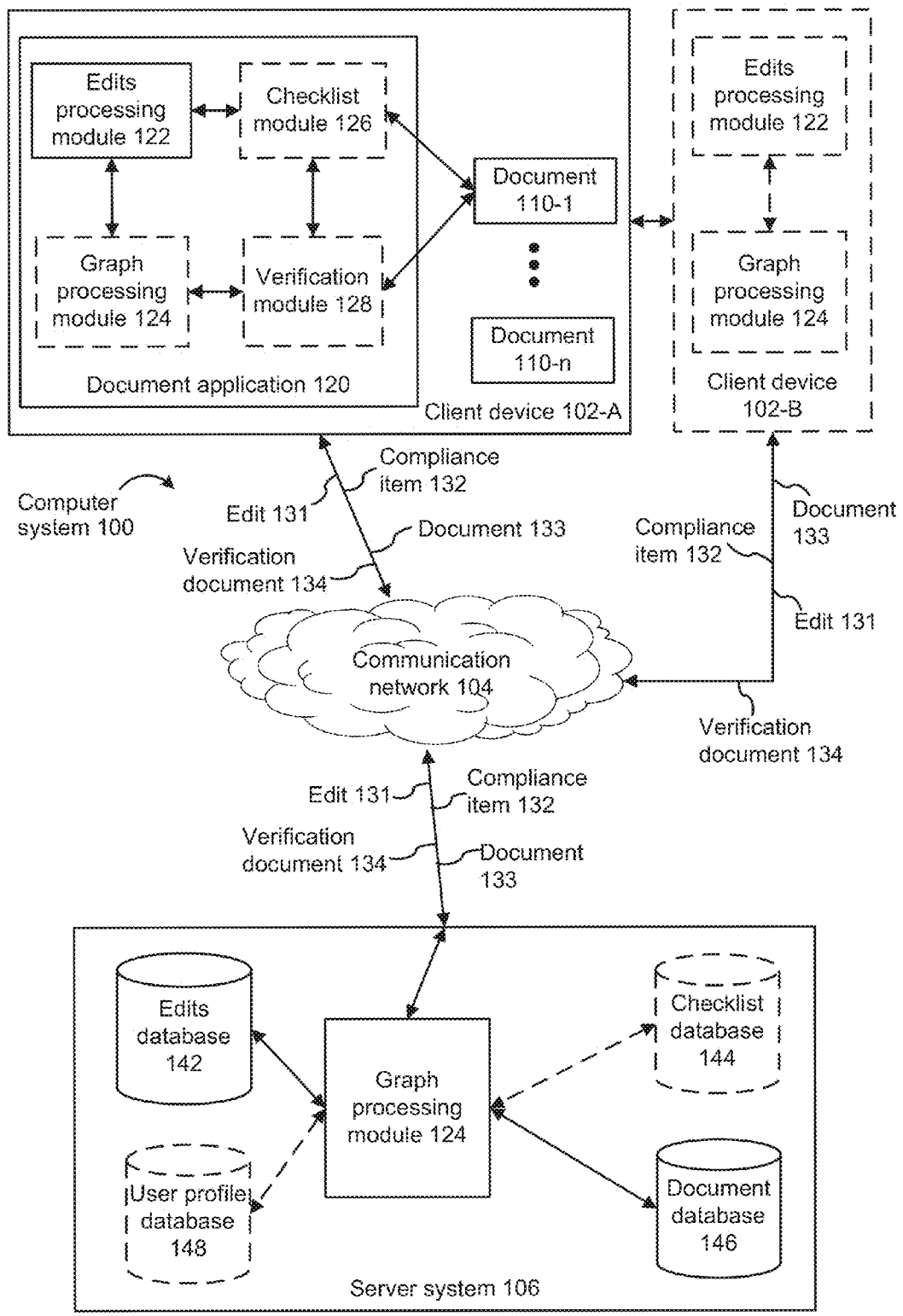
FIG. 1 is a block diagram illustrating a computer system, in accordance with some implementations.

FIG. 1 is a block diagram illustrating a computer system 100 for handling user editing history. In some implementations, the computer system 100 includes a client device 102 ("client 102"), a communication network 104, and a server system 106 ("server 106"). In some implementations, the computer system 100 includes two or more clients 102 (e.g., client 102-A, and client 102-B).

In some implementations, the client 102 receives one or more edits 131, compliance items 132, documents 133, and verification documents 134, from the server 106 or from another client (e.g., the client 102-B), and provides a document 133 along with its associated edits 131 or compliance items 132 to a user of the client 102 for review. In some implementations, the client 102 is a laptop, desktop, tablet computer or a smart phone, equipped with appropriate processing power or software packages.

In some implementations, the computer system 100 includes a document application 120 (e.g., a MICROSOFT WORD plug-in or macro, or a stand-alone document processing software application), which includes an edits processing module 122, a graph processing module 124 (optional), a checklist module 126 (optional), and a verification module 128 (optional). In some implementations, the client 102 also stores (e.g., temporarily in volatile memory or permanently on a hard drive) one or more documents (e.g., document 110-1 . . . document 110-n)—documents under review by a user of the client 102, or documents relevant thereto (e.g., verification documents).

In some implementations, the edits processing module 122 (1) processes one or more edits received from the server 106 (e.g., edits by other user stored in the Edits database 142 on the server 106), and edits received from a user of the client 102 (via a user input device), (2) formats (e.g., adjusts) the display of these edits, and (3) incorporates, partially or fully, these edits into a document (e.g., in accordance with a user action).

In some implementations, the graph processing module 124 creates and modifies a graph (e.g., the graph 600 in FIG. 6), in accordance with a user's edits to a draft. For example, after a new draft is created, the graph processing module 124 constructs a new node and adds the new node to the graph, with information from the draft (e.g., metadata identifying to which other prior versions the draft relates). In another example, after constructing a new node, the graph processing module 124 determines which nodes are related to the new node, and connects the new node and those nodes with edges. In still another example, after a user decides to permanently remove a draft, the graph processing module 124 removes the node corresponding to the draft from the graph, as well as edges between the removed node and the remaining nodes.

In some implementations, the graph processing module 124 resides on both the server 106 and the client 102 (e.g., so as to balance work load there between). For example, the graph processing module 142 resident on the client 102 constructs a new sub-node, and sends the new sub-node and its associated metadata (e.g., to which existing nodes ought to be connected), and the graph processing module 142 resident on the server 106 modifies the graph in accordance with the metadata. In other implementations, the graph processing module 124 resides on the server 106, but not on the client 102 (e.g., when the client 102 has limited processing power or network connection).

These approaches are advantageous, because work load is optimally allocated to and balanced between appropriate devices. For example, establishing connections (e.g., edges) between a new node and existing nodes in a graph can be resource consuming, and thus may be more efficiently handled by the server 106, which is often equipped with more processing power, rather than the client 102, which is often equipped with less processing power. In another example, when the server 106 is experiencing a heavy work load (e.g., handling a large number of client requests), tasks, such as constructing a node, can be handled, at least partially, by the clients 102, and then placed in a processing queue, and the server 106 can complete the remaining portions of these tasks at appropriate times (e.g., during off-peak hours).

In some implementations, the checklist module 126 processes (e.g., transmits, receives, displays, or hides from display) one or more checklists (or compliance items), a portion thereof, or information relating thereto (e.g., metadata) associated with a document under review by a user. For example, the checklist module 126 displays to a user a list of SEC requirements that need to be fulfilled, before a stock prospectus is delivered to potential investors. In another example, the checklist module 126 displays a list of IRS guidelines that must be followed, before a corporate tax return is officially filed.

In some implementations, the checklist module 126 adjusts the display of a checklist or one or more compliance items included therein, in accordance with a predefined user action (e.g., after a claimed deduction is removed from a tax return yet to be filed, an IRS guideline relating to the removed deduction is also removed from display). In some implementations, the checklist module 126 also records status information associated with a compliance item on a checklist (e.g., reviewed and satisfied, reviewed and not satisfied, or not yet reviewed).

In some implementations, the verification module 128 processes (e.g., transmits, receives, displays, or hides from display) one or more documents (also called verification documents), a portion thereof, or information relating thereto (e.g., metadata), which verify information included in another document. For example, the verification module 126 displays a name, a directory path, or an excerpt of a verification document that verifies one or more factual statements or assertions included in a stock prospectus.

In some implementations, the verification module 128 also adjusts the display (e.g., displays or hides from display) of verification documents 134, in accordance with a predefined user action (e.g., after a statement which the verification document verifies is removed by a user from a stock prospectus, a verification document related to the removed statement is also removed from display). In some implementations, the verification module 126 also records status information associated with a document (e.g., fully verified, partially verified, or not verified).

In some implementations, the client 102 stores user edits to a document in a change set (e.g., a data file), and transmits the change set to the server 106 for storage and for recordkeeping. In other implementations, user edits are transmitted from the client 102 on a character by character or edit by edit basis, to the server 106 which assembles the edits into a change set, and stores the change set in the edit database 142.

In some implementations, where the computer system 100 includes two or more clients 102, edits by different users are communicated between these clients 102, directly or indirectly. For example, edits made by user B (e.g., a junior associate attorney) of the client 102-B are transmitted to the client 102-A, where these edits are display to user A (e.g., a supervising attorney), thereby bypassing the server 106. In another example, when both user A and user B are reviewing the same document (e.g., the document 110-1), an edit by user A (or the edited document itself) is sent to, and displayed at the client 102-B (e.g., as either an actual edit or a proposed edit to the document 110-1), via a local connection between the client 102-A and the client 102-B (e.g., a Bluetooth connection, a wifi connection, an infrared connection, a cable connect, or a HDMI cable connect), thereby bypassing the communication network 104 (e.g., so as to provide a faster response time). In still another example, when user A makes an edit to the document (e.g. removing a paragraph from the document 110-1), the edit is sent and applied to (or reflected at) the client 102-B, within predefined threshold delays. These approaches are advantageous: Concurrent editing allows two or more users to collaborate on a project, thereby increasing efficiency.

In some implementations, the communication network 104 optionally includes the Internet, one or more local area networks (LANs), one or more wide area networks (WANs), other types of networks, or a combination of such networks.

In some implementations, the server 106 includes a graph processing module 124, an edits database 142, a checklist database 144, a document database 146, and a user profile database 148. In some implementations, the server 106 stores and transmits user edits and checklists or compliance items associated with a document to clients 102. In some implementations, the server 106 also stores one or more documents (e.g., a draft legal document, or verification documents relating thereto), using the document database 148.

In some implementations, the edits database 142 stores one or more edits or change sets (e.g., by the same or different users) associated with a document, and metadata (e.g., timestamps, access privileges, version numbers, or unique identifiers) associated with the one or more edits. In some implementations, the edits database 142 retrieves edits or change sets (e.g., edits associated with a particular document) stored therein, and transmits them to one or more clients 102, in accordance with a predefined user action (e.g., a user clicks open the particular document or a user request to download the particular document from the server 106). In some implementations, the edits database 142 selectively retrieves from, and transmits to a client 102, edits associated with a document. For example, after determining that a document is associated with a total of ten edits, but that a user of the client 102 has only read permission to five of the ten edits, the edits database 142 retrieves and transmits the five (rather than all ten) edits to the client 102 for display and for review by the user. In another example, after determining that a document is associated with a total of ten edits, but that a user of the client 102 has read, but not write, permission to the ten edits, the edits database 142 retrieves and transmits the ten edits, along with metadata indicating that the ten edits are not modifiable by the user, to the client 102 for display and for review (but not for modification) by the user.

In some implementations, the checklist database 144 stores one or more checklists associated with a document, as well as metadata (e.g., timestamps, access privileges, version numbers, or unique identifiers) associated therewith. In some implementations, a checklist includes one or more compliance items, and metadata associated therewith (e.g., timestamps, access privileges, version numbers, or unique identifiers).

In some implementations, the checklist database 144 retrieves checklists (e.g., checklists associated with a particular document) stored therein and transmits them to one or more clients 102, in accordance with a predefined user action (e.g., a user clicks open the particular document). In some implementations, the checklist database 144 selectively retrieves and transmits to a client a checklist associated with a document when a user has permission (e.g., read or write) to some but all checklists associated with the document. For example, after determining that a document (e.g., a patent application for a method of treating human cancer using radioactive ingredients that pollute drinking water) is associated with a total number of three checklists (e.g., a first checklist for FDA disclosure, a second checklist for USPTO disclosure, and a third checklist for EPA disclosure), but a user (e.g., a patent attorney specialized in medical treatment devices) of the client 102 has only read permission to two of the three checklists (e.g., the first checklist for FDA disclosure, and the second checklist for USPTO disclosure, but not the third checklist for EPA disclosure), the checklist database 144 retrieves and transmits the two (rather than all three) checklists to the client 102 for display and for review by the user. In another example, after determining that a document is associated with a total of ten checklists, but a user of the client 102 has read but not write permission to the ten checklists, the checklist database 144 retrieves and transmits the ten checklists, with metadata indicating that the ten checklists are not modifiable by the user, to the client 102 for display and for review (but not for modification) by the user.

In some implementations, a user has permission or access (e.g., read or write) to some but all compliance items on a checklist. For example, after determining that a document is associated with a checklist having three compliance items (e.g., a first compliance item for FDA disclosure, a second compliance item for USPTO disclosure, and a third compliance item for EPA disclosure), but a user of the client 102 has only read permission to two of the three compliance items (e.g., the first compliance item for FDA disclosure, and the second compliance item for USPTO disclosure, but not the third compliance item for EPA disclosure), the checklist database 144 retrieves and transmits these two (rather than all three) compliance items to the client 102 for display and for review by the user. In another example, after determining that a document is associated with a total of ten compliance items, but a user of the client 102 has read, but not write, permission to the ten compliance items, the checklist database 144 retrieves and transmits the ten compliance items, with metadata indicating that the ten compliance items are not modifiable by the user, to the client 102 for display and for review (but not for modification) by the user.

In some implementations, the document database 146 retrieves documents (e.g., a particular document) stored therein and transmits them to one or more clients 102, in accordance with a predefined user action (e.g., a user request to download the particular document to the client 102). In some implementations, the document database 148 selectively retrieves and transmits to a client 102 documents requested by a user when the user has permission (e.g., read or write) to some but all documents stored in the document database 148. In some implementations, the access control is achieved in accordance with information stored in the user profile database 148 (e.g., a user's login name, a role, or a user profile). For example, after determining a document is an email between a licensee and its attorney relating to an IP licensing transaction, the document database 146 refuses access to the email by a licensor or its attorney, in absence of an express grant of such access. These approaches are advantageous, because they promote security and preserve confidentiality between a client and its representatives (e.g., attorneys).

In some implementations, the document database 146 retrieves and transmits to the client 102 a document (e.g., a draft document that a reviewer would like to review), or one or more items relating thereto (e.g., verification documents, or access/modification history), in accordance with a predefined user action. For example, after a user requests to review verification documents associated with an IPO document, one or more verification documents (e.g., documents having information that verifies statements in the IPO document) are transmitted to the user for review. In another example, in response to a user request, an access or editing history of a document (e.g., which users have modified the document, or at what times the document was modified) is sent to the user. In a third example, in response to a user request for a specific prior version of a draft document, the specified prior version is sent to the user.

In some implementations, the user profile database 148 stores information concerning a client device (e.g., the IMEI number of a cell phone or a MAC address of a computer) and its users, e.g., whether a particular smart phone belongs to a buyer's attorney or a seller's attorney, in a purchasing transaction. For example, based on this information (e.g., association or relationship), edits by the buyer's attorney are automatically hidden to the seller's attorney, unless the buyer's attorney has expressly (or affirmatively) authorized such disclosure. These approaches are advantageous. Automatically detecting a user's role in a transaction based on a user name or a client device avoids inadvertent disclosure of confidential information, as required by various legal and ethical considerations.

In some implementations, to provide enhanced security and confidentiality, edits or change sets (e.g., a series of edits) are also encrypted, e.g., using public or private keys. In some implementations, an encryption/decryption key is automatically selected or determined in accordance with a user's user name, and thus the encryption/decryption process is carried out automatically (e.g., without the user's awareness thereof). These approaches are advantageous because they provide enhanced security without requiring additional user efforts (e.g., requiring a user to authenticate herself before access a draft). In some implementations, these approaches are implemented in part with MICROSOFT's SINGLE SIGN-ON technology.

In some implementations, the user profile database 148 also stores information concerning a user's preferences (e.g., user pattern data). In some implementations, a user preference is used (e.g., by the client 102 or the server 106) to predict what is to occur and thus take appropriate actions. For example, after detecting that user A often logs onto client 102-A (e.g., a work computer) during work hours, and then switches to client 102-B (e.g., a personal computer) during off hours to continue to work on the same document, client 102-B pre-loads a draft (e.g., a most recent draft) worked on by the user A during the daytime, from the client 102-A or from the server 106, as so to reduce wait time when the user A actually requests a download of the draft. These approaches are advantageous because, sometimes, the download process can be lengthy (e.g., due to low connection speed).

Figure 2:
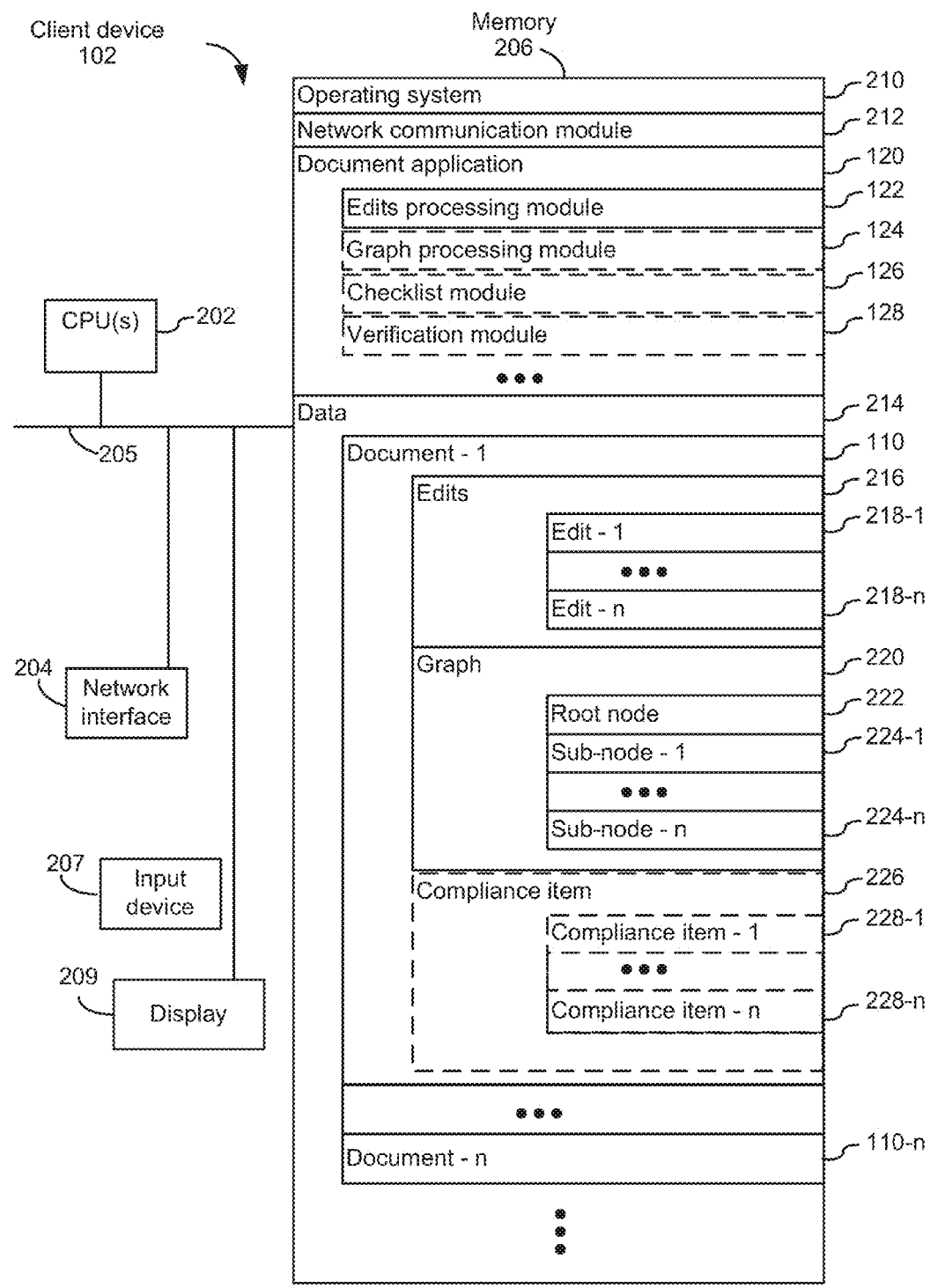
FIG. 2 is a block diagram illustrating a client device, in accordance with some implementations.

FIG. 2 is a block diagram illustrating a client 102 in accordance with some implementations. The client 102, in some implementations, includes one or more processing units CPU(s) 202 (also herein referred to as processors), one or more network interfaces 204, memory 206, an input device 207 (e.g., a keyboard, a mouse, a touchpad, or a touch screen), a display 209, and one or more communication buses 205 for interconnecting these components. The communication buses 205 optionally include circuitry (sometimes called a chipset) that interconnects and controls communications between system components. The memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

- an operating system 210, which includes procedures for handling various basic system services and for performing hardware dependent tasks;
- a network communication module (or instructions) 212 for connecting the client 102 with other devices (e.g., the server 106 or other clients 102) via one or more network interfaces 204 (wired or wireless), or the communication network 104 (FIG. 1);
- a document application 214 for displaying user interface components or controls (e.g., textboxes, buttons, radio buttons, drop-down lists) through which a user reviews or revises a document, which includes:
  - an edits processing module 122 for processing edits received from the server 106 or another client 102;
  - optionally, a graph processing module 124 for processing a graph (e.g., adding a node to a graph, or removing an edge between two nodes) in accordance with a user action;
  - optionally, a checklist module 126 for processing checklists or compliance items received from the server 106 or another client 102; and
  - optionally, a verification module 128 for processing verification documents received from the server 106 or another client 102; and
- data 214, stored on the client 102, which includes:
  - a document 110-n, which includes:
    - one or more edits 216 (e.g., edits 218-1 . . . , and 218-n by one or more users) to the document 110-n;
    - a graph 220 associated with to the document 110-n; and
    - one or more compliance items 226 (e.g., compliance item 228-1 . . . 228-n from one or more checklists) associated with the document 110-n.

In some implementations, the client 102 also includes a display 209. In some implementations, the display 209 includes a TV screen or a computer monitor.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

Figure 3:
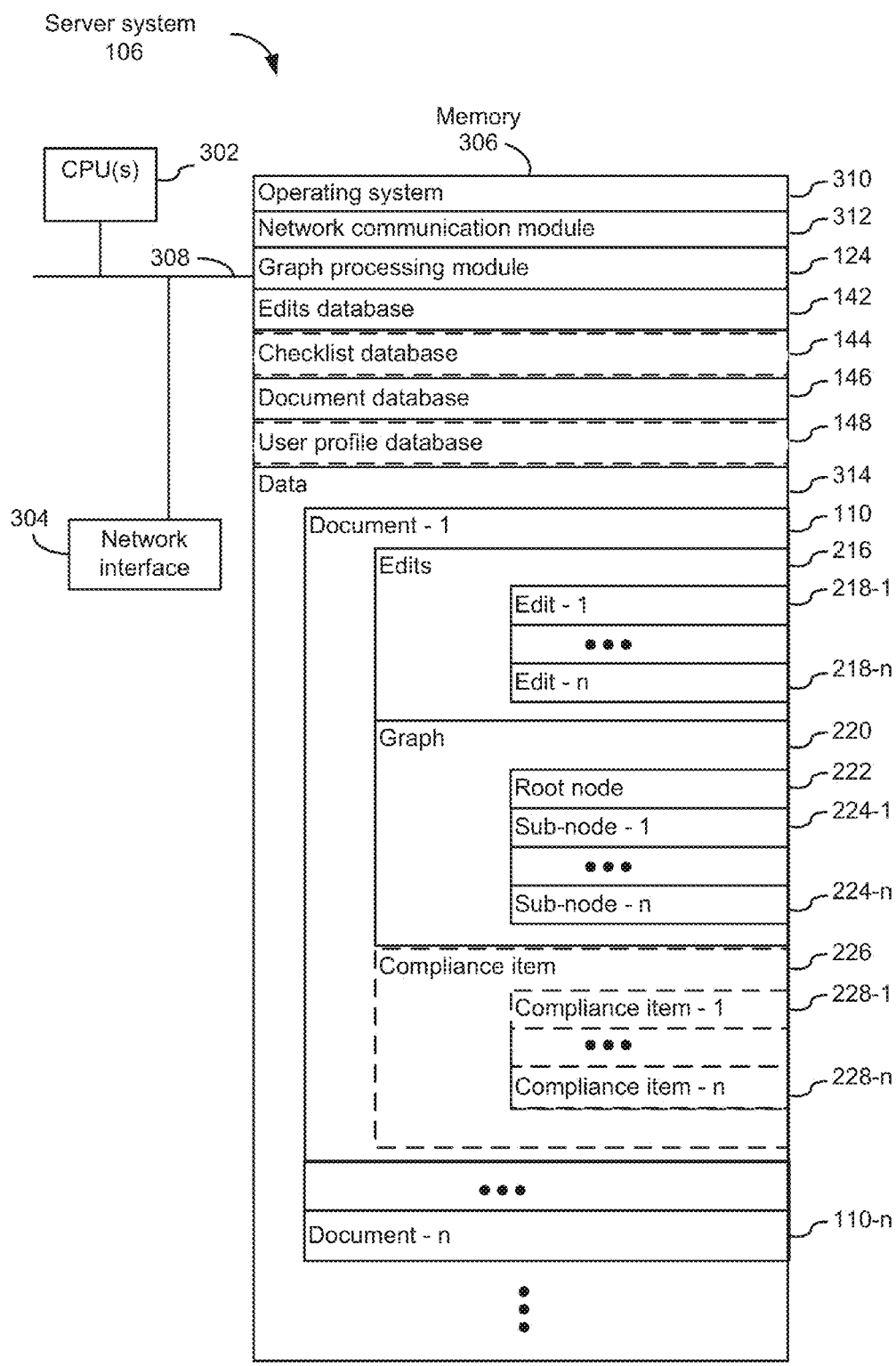
FIG. 3 is a block diagram illustrating a server system, in accordance with some implementations.

FIG. 3 is a block diagram illustrating the server system 106 ("server 106," also called a server), in accordance with some implementations. The server 106 typically includes one or more processing units CPU(s) 302 (also herein referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some implementations, the memory 306 or alternatively the non-transitory computer readable storage medium stores the following programs, modules and data structures, or a subset thereof:

- an operating system 310, which includes procedures for handling various basic system services and for performing hardware dependent tasks;
- a network communication module (or instructions) 312 for connecting the server 106 with other devices (e.g., one or more electronic devices 102) via the one or more network interfaces 304 (wired or wireless), or the communication network 104 (FIG. 1);
- optionally, a graph processing module 124 for processing a graph (e.g., adding a node to a graph, or removing an edge between two nodes) in accordance with a user action;
- an edits database 142 for storing and retrieving one or more user edits associated with a document, in accordance with a communication (e.g., a commend or an instruction) from the client 102;
- a checklist database 144 for storing and retrieving one or more user checklists or compliance items associated with a document, in accordance with a communication (e.g., a commend or an instruction) from the client 102; and
- a document database 146 for storing and retrieving one or more documents, in accordance with a communication (e.g., a commend or an instruction) from the client 102; and
- a user profile database 148 for storing and retrieving one or more user names (e.g., MICROSOFT WINDOWS login names), client device identifiers (e.g., an IMEI number for a smart phone or a MAC address for a computer), and user preferences.

In some implementations, one or more of the above identified elements are stored in one or more of the previously mentioned memory devices and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, the memory 306 optionally stores additional modules and data structures not described above.

Although FIG. 3 shows a "server system 106," also referred to as a server, FIG. 3 is intended more as functional description of the various features which may be present in server system than as a structural schematic of the implementations described herein. In practice, and as recognized by those of ordinary skill in the art, items shown separately could be combined and some items could be separated.

Figure 4:
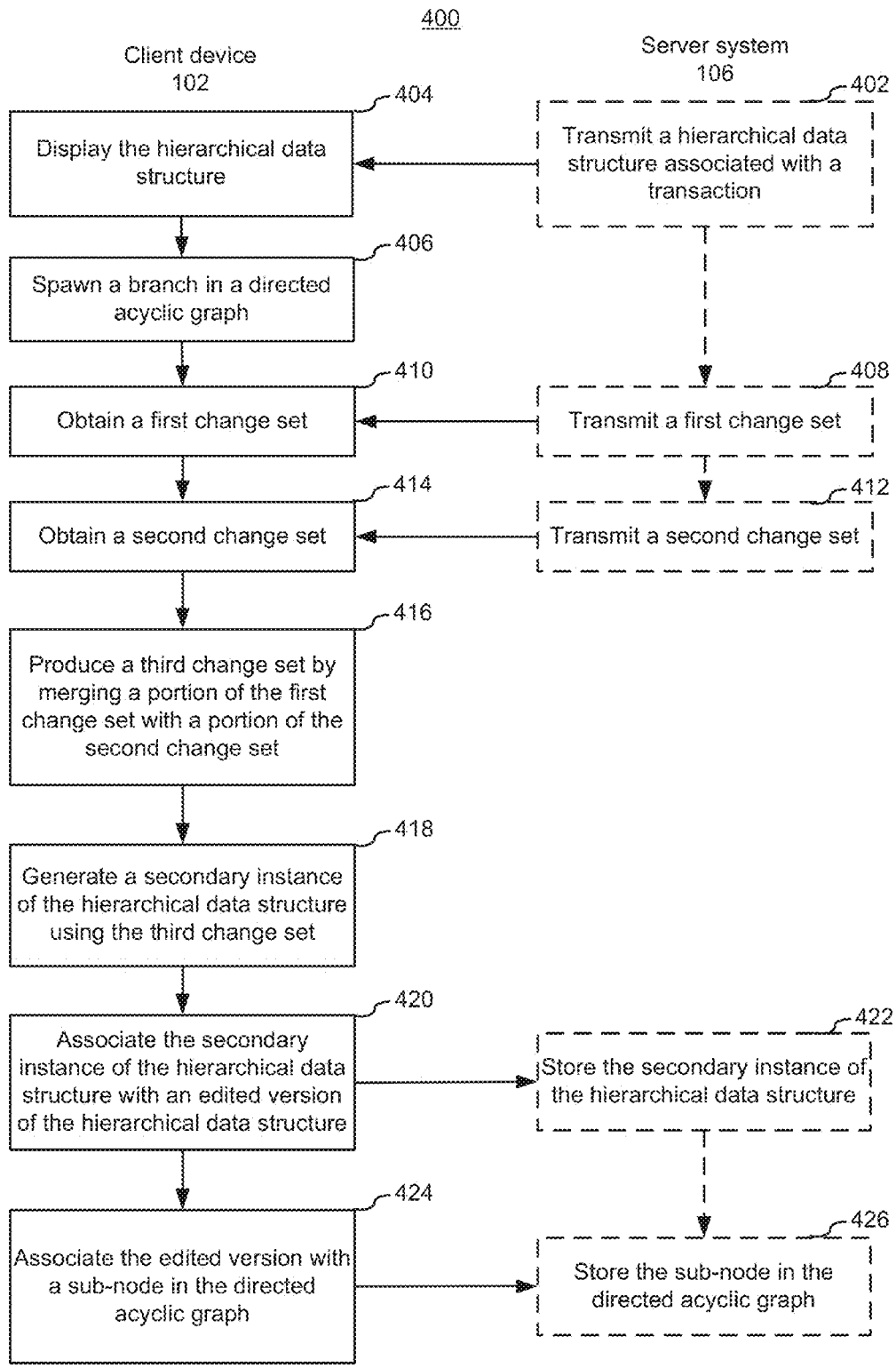
FIG. 4 is a flow chart illustrating a method for handling user editing history in a computer system, in accordance with some implementations.

FIG. 4 is a flow chart illustrating a method 400 for handling user editing history implemented at a computer system, in accordance with some implementations.

In some implementations, in response to a user request (e.g., a download request), the server 106 transmits (402) a hierarchical data structure associated with a transaction to a client 102. In some implementations, the hierarchical data structure includes a draft document (e.g., a MICROSOFT WORD/EXCEL/POWERPOINT document, an OPEN OFFICE document, STAR OFFICE document, or a plain text document) related to a business or legal transaction, e.g., a draft patent licensing agreement relating to an IP transaction. In some implementations, the server 106 transmits (402) the hierarchical data structure to the client 102, in accordance with a predefined schedule (e.g., at 7 pm every work day, documents worked on by user A at work are downloaded to the user A's personal computer so that user A can continue to work on these documents when she arrives at home).

In some implementations, the transaction also includes an IPO transaction, a merger or acquisition (M&A) transaction, a rights issue transaction (e.g., an issue of rights to purchase additional stock by a company to its existing stock holders), a debt issuance transaction (e.g., a municipal or U.S. Treasury bond issuance), or a security related transaction (e.g., a stock issuance). In some implementations, the transaction includes an intellectual property licensing transaction, or a settlement.

In some implementations, after receiving the hierarchical data structure, the client 102 displays (404) the hierarchical data structure (e.g., a draft), or a portion thereof (e.g., one or more paragraphs included in the draft), to a user of the client 102.

In some implementations, after detecting a predefined user action (e.g., a modification to the hierarchical data structure), the client 102 spawns (406) a branch (sometimes also called a vertex) in a directed acyclic graph (e.g., the graph 600 in FIG. 6), in anticipation that the user will create a new draft. In other implementations, the client 102 spawns the branch when the new draft is indeed created (e.g., a user request to save the modification).

In some implementations, within a predefined time interval after transmitting the hierarchical data structure (e.g., the draft) to the client 102, the server automatically (e.g., without user intervention) transmits a first change set (408) associated with the hierarchical data structure, and a second change set (412) associated with the hierarchical data structure, to the client 102. In other implementations, the first change set and the second change set are transmitted to the client 102 in response to a particular user request (e.g., a request to review edits to the draft by two specific users). In some implementations, a change set includes edits from multiple users rather than a single user associated with an edited version of a document. In some implementations, a change set includes progressive changes from a prior change set (changes not included in the prior change set), regardless of the version history. In some implementations, a change set includes edits from a single user between one version and its immediate preceding version of the same document.

In some implementations, the client 102 obtains the first change set (410) and the second change set (414) and produces a third change set (416) by merging all or a portion of the first change set with all or a portion of the second change set. In one example, the third change set includes half of the edits from the first change set and one third of the edits from the second change set. In some implementations, the third change set does not include edits from the first change set (e.g., removing the title of the document) that conflict with one or more edits from the second change set (e.g., add three more words to the title of the document).

In some implementations, the client 102 then generates (418) (e.g., using the graph processing module 124 resident on the client) a second instance of the hierarchical data structure using the third change set. In some implementations, the second instance of the hierarchical data structure is a new draft created by a user of the client 102, by applying edits included in the third change set to the draft received from the server 106 (or a master instance thereof).

In some implementations, the client 102 associates (420) the secondary instance of the hierarchical data structure with an edited version of the hierarchical data structure. In some implementations, the client 102 then transmits the secondary instance of the hierarchical data structure to the server 106, which stores (422) the second instance in the document database 146.

In some implementations, the client 102 further associates (424) (e.g., using the graph processing module 124 resident on the client) the edited version of the hierarchical data structure with a sub-node (e.g., the node 604 in FIG. 6) in the directed acyclic graph.

In other implementations, where the server 106 is equipped with more processing power, the server 106 associates (e.g., using the graph processing module 124 resident on the server) the edited version of the hierarchical data structure with a sub-node (e.g., the node 604 in FIG. 6) in the directed acyclic graph.

In some implementations, the client 102 transmits the edited version of the hierarchical data structure to the server 106, which stores (426) the edited version in the document database 146. In some implementations, the server 106 stores the edited version in the document database 146 using a version management system, such as MKS INTEGRITY, VCS, IBM RATIONAL TEAM CONCERT, VERACITY, FOSSIL, or GNU ARCH.

Figure 5A:
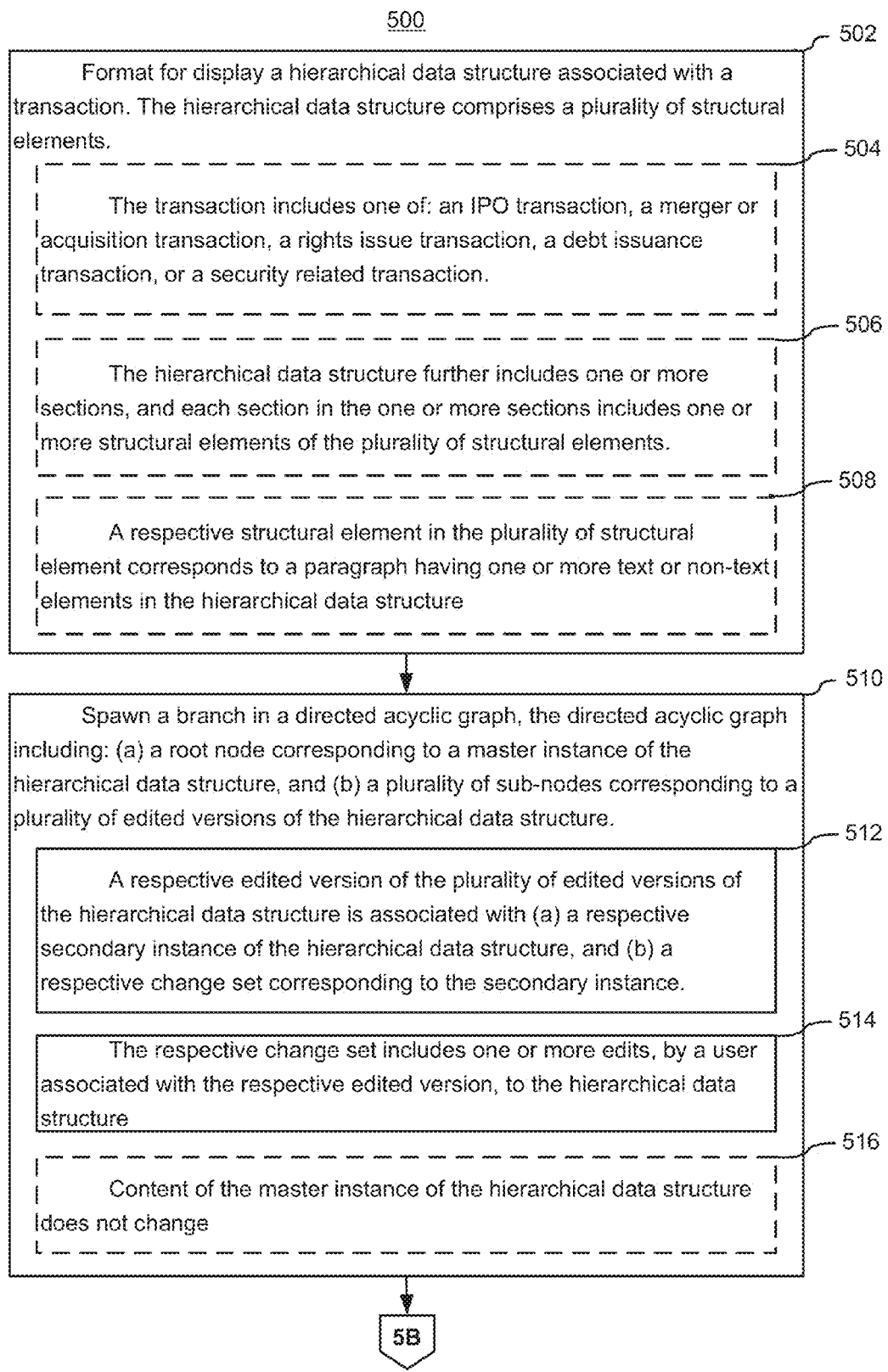
FIGS. 5A-5C are flow charts illustrating a first example method for handling user editing history, in accordance with some implementations.
Figure 5B:
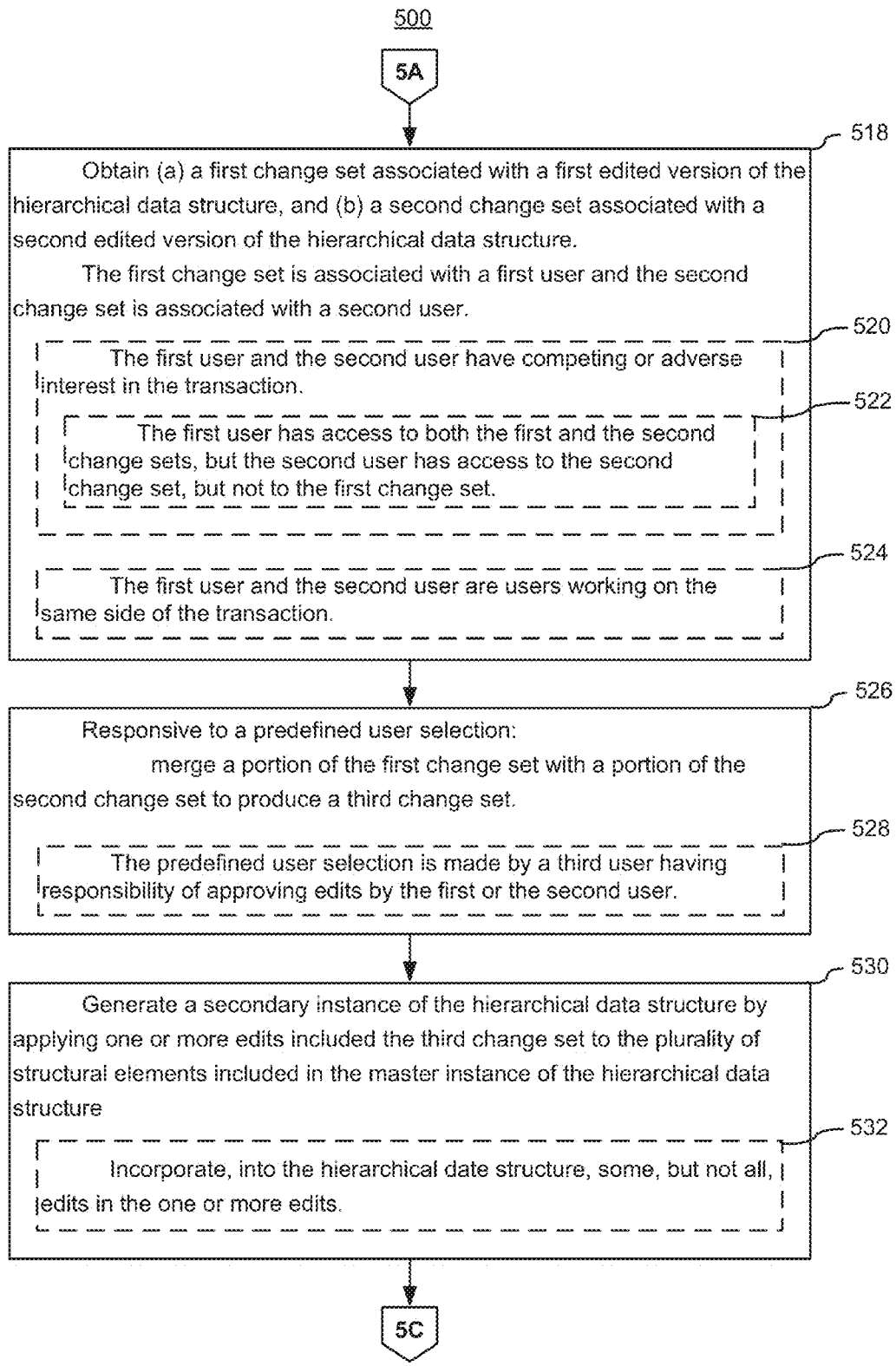
Figure 5C:
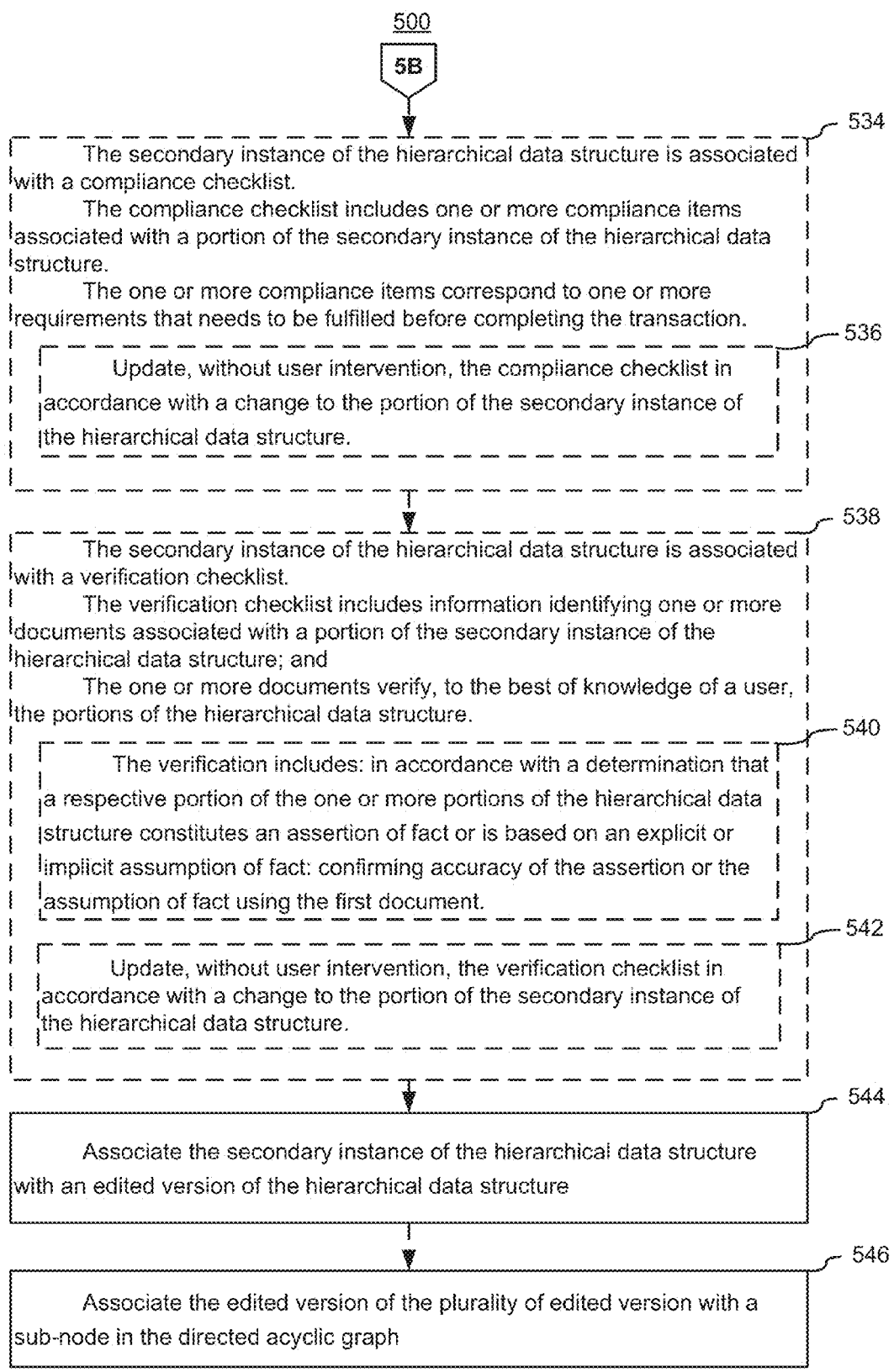

FIGS. 5A-5C are flow charts illustrating an example method 500 for handling editing history, implemented at either the client 102 or the server 106, in accordance with some implementations.

In some implementations, a draft document is displayed to a reviewer. In some implementations, a computer system (e.g., a client 102 or a server 106) formats (502) for display a hierarchical data structure associated with a transaction to a user (e.g., a user of the client 102). In some implementations, formatting for display (e.g., by a server 106 or by a client 102) the hierarchical data structure includes displaying the hierarchical data structure, or determining or adjusting font, brightness level, or contrast level thereof.

In some implementations, the transaction includes both legal and business transactions. In some implementations, the transaction includes (504) an IPO transaction, a merger or acquisition (M & A) transaction, a rights issue transaction (e.g., issue of rights to buy additional securities in a company made to the company's existing security holders), a debt issuance transaction (e.g., a municipal or U.S. Treasury bond issuance), or a security related transaction (e.g., a stock issuance). In some implementations, the transaction includes a licensing transaction, or a settlement.

In some implementations, the hierarchical data structure is a draft document (e.g., a MICROSOFT WORD/EXCEL/ POWERPOINT document, an OPEN OFFICE document, STAR OFFICE document, or a plain text document) relating to a legal or business transaction, e.g., a draft patent licensing agreement relating to an IP transaction.

In some implementations, the hierarchical data structure comprises a plurality of structural elements (506). For example, in some cases, the hierarchical data structure is a WORD document or a plain ASCII text document including several paragraphs or pages.

In some implementations, the hierarchical data structure further includes one or more sections, and each section includes one or more structural elements in the plurality of structural elements (506). In some implementations, the hierarchical data structure is a document (e.g., a MICROSOFT WORD/EXCEL/POWERPOINT document, an OPEN OFFICE document, STAR OFFICE document, or a plain text document) with one or more sections (e.g., pages, parts, portions, or clauses), and each section (e.g., a page, a part, a portion, or a clause) includes one or more paragraphs.

In some implementations, a paragraph included in a document includes both text and non-text elements. In some implementations, a respective structural element in the plurality of structural elements corresponds to a paragraph having one or more text or non-text elements in the hierarchical data structure (508). In some implementations, a respective structural element is a paragraph, or a portion thereof, selected by a user. In some implementations, the selected paragraph, or the portion thereof, includes one or more text or non-text elements. In some implementations, a text element includes a character, a word, a phrase, a term, a sentence, a paragraph or a section of text; and a non-text element includes a table, a grid, an image, a video, an embedded object into the document. For example, a user can select a region or a paragraph that includes a table, a grid, or an image, embedded in a document and edit the embedded table, grid, or image. Enabling a user to edit a non-text element is advantageous: In many contexts, such as a legal one, a formality edit (e.g., a change to layout of a table) can be as important as a substantive one.

In some implementations, a graph structure (e.g., the graph 600 in FIG. 6) corresponding to user editing history of the hierarchical data structure is maintained. In some implementations, the computer system (e.g., using the graph processing module 124 resident on either the client 102 or the server 106) spawns (510) a branch in a directed acyclic graph (e.g., the graph 600 in FIG. 6), the directed acyclic graph including: (a) a root node (e.g., node 602 in FIG. 6) corresponding to a master instance of the hierarchical data structure, and (b) a plurality of sub-nodes (e.g., nodes 603, 604 . . . in FIG. 6) corresponding to a plurality of edited versions (e.g., modified versions) of the hierarchical data structure. In some implementations, the directed acyclic graph is a tree-like structure. In some implementations, the directed acyclic graph is a rooted-tree structure.

In other implementations, e.g., where document metadata (e.g., timestamps) are available, the graph is undirected, because a temporal relationship between two drafts can be derived from the metadata (e.g., timestamps). In still other implementations, the graph is cyclic (e.g., including a circle or a loop). For example, when a user abandons a current draft and returns to a previous draft, the graph includes not only a first edge pointing from a node presenting the current draft to another node representing the previous draft, but also a second edge pointing from the other node representing the previous draft to the node presenting the current draft, thereby forming a circle or loop.

In some implementations, a respective edited version in the plurality of edited versions of the hierarchical data structure is associated with (a) a respective secondary instance of the hierarchical data structure, and (b) a respective change set corresponding to the secondary instance (512). For example, a particular draft is saved as one version of the draft document and changes between the particular draft and its preceding version is saved in a change set. In some cases, an edited version is associated with a secondary instance or a change set using a unique identifier (e.g., a document or version identifier).

In some implementations, the respective change set includes one or more edits by a user associated with the respective edited version, to the hierarchical data structure (514). For example, a changes set includes all edits by a user to a document (i) since the user has worked on the document, or (ii) during a predefined user session (e.g., to provide a recovery feature). In another example, a changes set includes all changes (e.g., substantive and formality) between one version of a draft, and a preceding version of the same draft.

In some implementations, the computer system obtains (518) (a) a first change set associated with a first edited version of the hierarchical data structure, and (b) a second change set associated with a second edited version of the hierarchical data structure.

In some implementations, the first change set is associated with a first user; and the second change set is associated with a second user (e.g., a user distinct from the first user). In some implementations, the first change set includes edits made or approved by the first user and the second change set includes edits made or approved by the second user. For example, the first change set includes edits made to a purchasing proposal by a junior attorney and the second change set includes edits made to the same purchasing proposal by a senior attorney.

In some implementations, the first user and the second user have competing or adverse interest in the transaction (520). For example, the first user is a representative of a buyer in a stock purchasing transaction while the second user is a representative of a seller in the same transaction. In another example, the first user is a first sub-contractor bidding for a bridge construction project while the second user is a second sub-contractor bidding for the same bridge construction project and the first change set includes bids entered by the first sub-contractor into a template bidding document, and the second change set includes pricing information entered by the second sub-contractor into the template bidding document.

In some implementations (e.g., where the first user and the second user have competing or adverse interest in the transaction), the computer system maintains access control to the first and second change sets. In some implementations, the first user has access to both the first and the second change sets, but the second user has access to the second change set, but not to the first change set (522). In some cases, access to edits to the hierarchical data structure is asymmetric between the first user and the second user. For example, the first user, as a general contractor (or an attorney therefore), has (e.g., read or write) access to edits made to a bidding document (e.g., the hierarchical data structure) by a sub-contractor (e.g., the second user) but the sub-contractor (e.g., the second user) does not have (e.g., read or write)

access to edits made to the bidding document by the general contractor. In another example, the second user, an attorney for an offeror, can send an offering price to the first user, an attorney for an offeree, but cannot see changes to the offering price (e.g., counter offers) by the first user, unless specifically authorized.

In some implementations, the first and second users are users working on the same side of the transaction (524). For example, the first user collaborates with the second user in a merger and acquisition transaction. In another example, the first and second users are two sub-contractors working together to bid for a bridge construction project from a general contractor.

In some implementations, a user of the computer system is on the same side of the transaction with either the first or the second user. For example, the user of the computer system is collaborating with the first or the second user. In some implementations, a user of the computer system is a third party to the transaction in addition to or independent from the first and the second users. For example, the user of the computer system is a general contractor seeking bids from the first user (e.g., a sub-contractor) and the second user (e.g. another sub-contractor).

In some implementations, responsive to a predefined user selection (e.g., a selective rejection or acceptance of edits in the first and second change sets), the computer system merges (526) a portion of the first change set with a portion of the second change set to produce a third change set. In some implementations, some, but not all, edits included in the first change set are merged (or selected) into the third change set.

In some implementations, the predefined user selection is made by a third user having responsibility of approving edits by the first or the second user (528), e.g., by a supervising law firm partner responsible for reviewing and approving edits to a draft contract edited by two associate attorneys (e.g., the first or the second users). In another example, the predefined user selection is by an attorney for a general contractor soliciting bids (e.g., edits to a template bidding document) from two sub-contractors or attorneys therefore (e.g., the first or the second users).

In some implementations, edits from the first and second change sets are merged into the third change set automatically if no conflict arises. In some implementations, merging the portion of the first change set with the portion of the second change set includes: (i) if the merging does not result in a conflict, merging, without user intervention, the portion of the first change set with the portion of the second change set; and (ii) if the merging does result in a conflict between edits in the portion of the first change set and the edits in the portion of the second change set, requesting a user to resolve the conflict.

For example, if edits from the first change set (e.g., changing the front of a heading from "Times New Roman" to "Arial") do not conflict with edits from the second change set (e.g., removing a paragraph under that heading), the edits from the first and second change sets are merged (e.g., applied) automatically, without requiring any input from a user. In another example, if edits from the first change set (e.g., changing the front of a heading from "Times New Roman" to "Book Antigua") conflict with edits from the second change set (changing the front of the heading from "Times New Roman" to "Arial"), the computer system requests a user (e.g., a reviewer) to resolve the conflict (e.g., displaying the conflicting edits to the user and requests that the user to decide which edit should prevail).

In some implementations, an edit conflicts with another edit when these two edits cannot be applied in conjunction with (or in tandem with) each other. For example, a junior associate attorney—who is not aware of a recent California Supreme Court decision holding that arbitration clauses in employment contracts are unenforceable—tightens the language of a mandatory arbitration clause included in a draft employment contract, while a senior associate attorney working on the same draft—who is more diligent on keeping up with recent development of case laws—removes the mandatory arbitration clause from the draft.

In some implementations, edits from the first and second change sets are merged into the third change set automatically if they do not change the meaning (e.g., semantics) of a document. In some implementations, merging the portion of the first change set with the portion of the second change set includes: (i) if the merging does not result in a change of semantics of the hierarchical data structure, merging, without user intervention, the portion of the first change set with the portion of the second change set; and (ii) if the merging does result in a change of semantics of the hierarchical data structure, requesting a user to accept or reject the change of semantics.

For example, if edits from the first change set (e.g., adding the phrase "do not" before the word "agree" in a heading) when applied in tandem with (e.g., together with) edits from the second change set (e.g., in the same heading, changing the word "agree" to "consent") do not result in a change of meaning to a document or a portion thereof (e.g., the heading), the edits from the first and second change sets are merged automatically, without requiring any input from a user.

In another example, however, if edits from the first change set (e.g., in a heading, adding a word "not" before a word "agree") when applied in tandem with (e.g., together with) edits from the second change set (e.g., in the same heading, changing the word "agree" to "disagree") would result in a change of meaning to a document or a portion thereof (e.g., the heading), the computer system requests a user (e.g., a reviewer) to resolve the conflict (e.g., displaying the conflicting edits to the user and requests that the user decide which edit ought to prevail). These approaches are advantageous because conventional methods do not focus on the semantic aspects of handling conflicting user edits, which are often crucial in the context of handling legal documents.

In some implementations, content of the master instance of the hierarchical data structure does not change (516) (e.g., unmodifiable). In some implementations, after a file is created, a master instance (also called a master file, or a master copy) of the file is also created; and no user can change or edit the master copy (e.g., content therein or metadata associated therewith, such as creation timestamps, authorship, or version number). In some implementations, e.g., where stricter access control is desired, no user (not even an owner of a document) has write permission to the master instance once it is created (e.g., to preserve file history and integrity), although view permissions are still available.

In some implementations, proposed edits by a user are partially adopted by a reviewer. In some implementations, applying one or more edits included in the third change set to the plurality of structural elements included in the master instance of the hierarchical data structure includes incorporating, into the hierarchical data structure, some, but not all, edits in the one or more edits (532). For example, when reviewing a series of ten proposed edits by a junior attorney to a draft IP licensing agreement, a law firm partner approves seven of the ten proposed edits, but rejects the remaining three proposed edits. In some implementations, edits incorporated into the hierarchical data structure (or edits included in the third change set) include both edits by the first user and edits by the second user.

In some implementations, a reviewer produces another (e.g., a newer) draft by applying edits included in the change set to the master instance. In some implementations, the computer system generates (530) a secondary instance of the hierarchical data structure by applying one or more edits included in the third change set to the plurality of structural elements included in the master instance of the hierarchical data structure. For example, after selectively adopting edits by the first and second users, the reviewer applies these adopted edits to the master instance to generate an updated (e.g., newer) draft.

In some implementations, the computer system associates (544) the secondary instance of the hierarchical data structure with an edited version of the hierarchical data structure. For example, after finishing editing a draft, a user saves a new version (e.g., the node 610 in FIG. 6) of the draft, as well as a change set including all changes between the new version (e.g., the node 610 in FIG. 6) and its preceding version (e.g., the node 606 in FIG. 6)).

In some implementations, the computer system associates (546) the edited version in the plurality of edited versions with a sub-node in the directed acyclic graph. For example, the computer system assigns a unique identifier to the edited version, and assigns the same identifier to the sub-node in the directed acyclic graph, thereby establishing a logical relationship between the edited version and the sub-node, using the unique identifier. In some implementations, the unique identifier is included as part of the metadata for the edited version.

In some implementations, a secondary instance of a document is accompanied by a compliance item check list. In some implementations, the secondary instance of the hierarchical data structure is associated with a compliance checklist, the compliance checklist includes one or more compliance items associated with a portion of the secondary instance of the hierarchical data structure, and the one or more compliance items correspond to one or more requirements that needs to be fulfilled before completing the transaction (534).

For example, in some cases, a draft document has an accompanying checklist that includes one or more compliance items. The one or more compliance items are associated with (e.g., concerned with or relating to) a portion of the secondary instance of the hierarchical data structure (e.g., a specific paragraph or clause in a draft contract).

In some implementations, a compliance item corresponds to a requirement that needs to be fulfilled before completing the transaction. In some implementations, a requirement is a legal requirement or a user defined requirement. For example, a legal requirement includes a statutory requirement that statements regarding company revenue must be verified by an independent auditing agency, such as Ernest and Young. In another example, a user defined requirement includes an internal requirement (e.g., a self-imposed requirement, as opposed to a requirement by law) that salary information about board members is considered private and thus not to be published without express consent of a majority of the board members.

For example, in response to a predefined user action (e.g., a right or double click) on a paragraph in the draft document (e.g., a paragraph about company A's past revenue), compliance items associated with the paragraph are identified and displayed to a reviewer. In another example, after highlighting a section on a client company's past revenue, a user right-clicks the number representing the client company's revenue from last year, and in response to the right click, one or more compliance items associated with that number are displayed (e.g., a requirement under SEC rules that all statements on past revenue be accompanied with warnings to potential inventors that similar results are not guaranteed).

In some implementations, the computer system (e.g., a client 102 or a server 106) updates (536) the display of the one or more compliance items, without user intervention, in accordance with a change to the portion of the secondary instance of the hierarchical data structure. For example, after a user removes a paragraph from a draft, or relocates the paragraph from the first page to the second page of the draft, compliance items associated with the paragraphs are updated (e.g., removed or relocated) accordingly, without requiring the user to refresh or otherwise to update the display of compliance items. In another example, after a user removes a sentence (e.g., a statement) from a paragraph, compliance items associated with the sentence is removed, and compliance items with the remaining portion of the paragraph are adjusted or re-arranged visually (e.g., the list including the compliance items is expanded into a longer form, or the remaining compliance items are displayed in larger and thus more noticeable textboxes).

In some implementations, a document under review is linked to other documents that support truth of statements included in the document, for ease of review. In some implementations, a secondary instance of the hierarchical data structure is associated with a verification checklist, and the verification checklist includes information identifying one or more documents associated with a portion of the secondary instance of the hierarchical data structure; and the one or more documents verify, to the best of knowledge of a user, the portions of the hierarchical data structure (538). For example, a draft document includes an accompanying list of verification documents or references (e.g., a URL, a link, a file name, a directory path, or a file identifier) thereto. In another example, a draft annual finance report for the year of 2012 may include a list of document names identifying financial documents for each quarter of the year 2012 (e.g., FINANCIAL_STATEMENT_2012_Q1.doc . . . FINANCIAL_STATEMENT_2012_Q4.doc).

In some implementations, a document (e.g., a verification document) identified on the verification checklist verifies, according to a user (e.g., based on the user's reasonable understanding or belief), one or more portions of the secondary instance of the hierarchical data structure.

In some implementations, verification is defined (e.g., includes) (540), in accordance with a determination that a respective portion in the one or more portions of the hierarchical data structure constitutes an assertion of fact or is based on an explicit or implicit assumption of fact, confirming accuracy of the assertion or the assumption of fact using the first document (540). For example, the file Company1_2012_Quarter_1_earnings.doc is reasonably believed by an attorney preparing a stock prospectus to include information (e.g., a company's earnings in the first quarter of 2012) that can verify (e.g., confirm, support, or establish, conclusively or partially, the truth of) a statement in a stock prospectus relating to Company1's earnings in the first quarter of 2012.

In some implementations, a verification checklist is update automatically based on a change (e.g., an edit) to a document. In some implementations, the computer system updates (542), without user intervention, the verification checklist in accordance with a change (e.g., deleting or adding a paragraph) to the portion of the secondary instance of the hierarchical data structure.

In some implementations, responsive to a user action modifying a portion of a draft document, verification checklist accompanying the draft is updated to produce an updated verification checklist in accordance with the modification. For example, after an attorney preparing a stock prospectus removes a statement regarding past revenue from the prospectus, verification checklist for the prospectus is updated by removing verification document or a reference thereto relating to the removed statements concerning past revenue.

In some implementations, a verification checklist is associated with a unique identifier. For example, in some instances, an updated verification checklist is associated with a different identifier (e.g., a different version number) from the original verification checklist, to facilitate version management of verification checklists.

FIG. 6 is a diagram illustrating an example graph 600, in accordance with some implementations.

As shown in FIG. 6, the graph 600 includes several nodes and edges connecting these nodes. The node 602 (having a large size relative to other nodes in the graph) represents a master instance of a document (e.g., an IP licensing agreement). In some cases, because no user has write access to the master instance (e.g., the master instance is locked once created), edited versions of the documents are saved as secondary instances (as represented by e.g., nodes 603, 604, 605 . . . ).

In other cases, the nodes (e.g., 603, 604 . . . 618) represent a change set associated with a draft (rather than the draft itself). In some cases, a change set associated with a draft includes changes between a draft and its immediate preceding version. A particular draft can then be generated or restored by applying change sets associated with prior versions of the draft to the master instance.

For example, in the event of a system crash during which a first draft (corresponding to the node 604) is corrupted, the computer system can restore the first draft (corresponding to the node 604) by applying edits included in the change sets 604 to the master instance 602. In another example, in the event of a power outage after which a second draft (corresponding to the node 610) is lost, the computer system can restore the second draft (corresponding to the node 610) by applying edits included in the change sets 606 and 610 (e.g., in a predefined sequence or in parallel) to the master instance 602. In still another example, in the event a reviewer would like to abandon a current draft (corresponding to the node 610) and return to the preceding draft (corresponding to the node 606), the reviewer can undo edits included in the change set 610 to the current draft (corresponding to the node 610), after which the preceding draft is restored.

These approaches are advantageous. First, only change sets and the master instance of the document need to be stored or transmitted—and draft documents themselves need not be stored or transmitted—thereby conserving storage space and network bandwidth. Second, a particular version (or all prior versions) of a draft can be recovered after an adverse event (e.g., by applying relevant change sets to the master instance). Third, buyer's remorse is allowed. That is, a user can roll back to the preceding version of a document by undoing edits included in a change set associated with the current version. Similarly, the user can roll back to any particular prior version of the document by undoing edits included in change sets associated the version between the current version and the particular prior version.

In some cases, even numbered nodes represent secondary instances of the document (e.g., modified versions of the IP licensing agreement) created by a first user (or a first group of users 630) (e.g., a licensor and its attorneys in an IP licensing transaction) and odd numbered nodes represent secondary instances of the document (e.g., modified versions of the IP licensing agreement) created by a second user (or a second group of users 640) (e.g., a licensee and its attorneys, in the IP licensing transaction).

In some cases, starting with the same IP licensing agreement template 602, two different associate attorneys (Tom and Jerry) make different edits to the template 602 and save two separate drafts (604 and 606, respectively). In some cases, the template 602 is obtained from a third party source (e.g., California State Bar's website) and is thus unmodifiable (e.g., in a PDF format).

After finishing the draft 604, Tom, without any proof reading, sends the draft 604 to a law firm partner (Donald) for review. Unlike Tom, however, Jerry proof-reads his draft several times, correcting a small number of mistakes along the way, and then saves another draft 610. Jerry later sends to the draft 610 to Donald for review.

After receiving drafts 604 and 610, Donald reviews edits by Tom (e.g., a secondary instance with a first change set) and edits by Jerry (e.g., another secondary instance with a second change set), and selectively adopts (e.g., merges, as indicated by the dash line) edits by Tom and Jerry (e.g., accepting some edits by Tom and some other edits by Jerry). After completing the review, Donald saves his own draft 612, which is considered ready to be sent to opposing counsels (Mickey and his associate attorneys) for negotiation (or to the client for approval).

In some cases, attorneys for the licensee (Mickey and his associate attorneys) also start from the template 602 (e.g., because it is considered a good starting point). Mickey takes a brief review of the standard template 602, and highlights three important sections (a severability clause, an arbitration clause, and a governing law clause) in the template 602, and saves his changes (e.g., the highlights) in draft 603. Mickey then sends the draft 603 to three separate attorneys (White, Black, and Gray) to work on different highlighted sections (the severability clause, the arbitration clause, and the governing law clause, respectively).

After receiving the draft 603, White, Black, and Gray save local drafts (605, 609, and 613, respective) and start working on their assignments. After making edits to their respective local copies (605, 609, and 613), White, Black, and Gray save new drafts and send them back to Mickey for review.

Because White, Black, and Gray worked on discrete sections, there is no conflict among the edits by White, Black, and Gray; all edits are therefore merged automatically into the draft 614, which Mickey later sends to Donald for review in order to move the transaction forward.

After reviewing the draft 614 (by Mickey and its team), Donald selectively adopts edits (or merges, as indicated by the dash line) by his team (Tom and Jerry) into those by Mickey's team (Mickey, White, Black, and Gray), and produces another draft 614. After a thorough review of the draft 614, Donald concludes that terms suggested by Mickey and its team are advantageous to the client and therefore sends the draft 614, along with his positive recommendation, to the client for approval.

After receiving the draft 614 from Donald, the client makes some formality edits (e.g., updating the tax identification number and correcting a spelling error) and saves another draft 616. The client then sends the draft 616 back to Donald for final review with authorization for Donald to consummate, on its behalf, the licensing transaction on the terms included in the draft 616.

After receiving the draft 616, Donald corrects some formatting issues in the draft 614 and saves a final draft 618. Donald then sends the draft 618 to Mickey for review.

After obtaining client approval, Mickey and Donald agree on the phone that all terms included in the draft 618 are acceptable and a deal is reached.

In some cases, all the above-mentioned drafts (e.g., 602, 603, 604, 605 . . . , and 618) are generated using the document application 140 (FIGS. 1 and 2), and saved in the document database 146 (FIG. 1). In some cases, the document application is part of a software system under management (e.g., maintenance or control) by the first group of users 630 (Donald's law firm). To facilitate negotiation process, the second group of users 640 also has access to the software system (e.g., to retrieve draft authorized by Donald). In some cases, drafts by the first group of users are not accessible to the second group of users, and vice versa, unless specifically authorized, e.g., to protect attorney client privilege and attorney work product privilege.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first change set could be termed a second change set, and, similarly, a second change set could be termed a first change set, without changing the meaning of the description, so long as all occurrences of the "first change set" are renamed consistently and all occurrences of the "second change set" are renamed consistently. The first change set, and the second change set are both change sets, but they are not the same change set.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:

at a computer system:
formatting for display a hierarchical data structure associated with a transaction, wherein the hierarchical data structure comprises a plurality of structural elements within a single first document;
spawning, from a first sub-node in a plurality of sub-nodes to a second sub-node in the plurality of sub-nodes, a branch in a directed acyclic graph, the directed acyclic graph including: (a) a root node corresponding to a master instance of the hierarchical data structure, (b) the plurality of sub-nodes, and (c) a plurality of branches, wherein each respective sub-node in the plurality of sub-nodes corresponds to an edited version of the hierarchical data structure in a plurality of edited versions of the hierarchical data structure in a respective edited version of the single first document, and wherein a respective sub-node in the plurality of sub-nodes is connected with another sub-node in the plurality of sub-nodes by at least one branch in the plurality of branches,
wherein a respective edited version in the plurality of edited versions of the hierarchical data structure is associated with (a) a respective secondary instance of the hierarchical data structure, and (b) a respective change set corresponding to the secondary instance, and
wherein the respective change set includes one or more edits, by a user associated with the respective edited version of the hierarchical data structure, to the hierarchical data structure;
obtaining (a) a first change set associated with a first edited version of the hierarchical data structure, wherein the first change set is also associated with the first sub-node and includes one or more edits, by a user associated with the first edited version of the hierarchical data structure, with respect to two or more sub-nodes in the plurality of sub-nodes, and (b) a second change set associated with a second edited version of the hierarchical data structure, wherein the second change set is associated with a third sub-node in the plurality of sub-nodes, the third sub-node having at least one common ancestor node with the first sub-node in the directed acyclic graph; and wherein the first change set is associated with a first user and the second change set is associated with a second user and wherein the first edited version and the second edited version are in the plurality of edited versions; and responsive to a predefined user selection:
- merging a portion of the first change set with a portion of the second change set to produce a third change set while retaining the first change set and the second change set,
- generating an additional secondary instance of the hierarchical data structure by applying one or more edits included in the third change set to the plurality of structural elements included in the master instance of the hierarchical data structure,
- associating the additional secondary instance of the hierarchical data structure with an edited version of the hierarchical data structure, and
- associating the edited version of the hierarchical data structure with the second sub-node in the directed acyclic graph.

2. The method of claim 1, wherein the first user and the second user have a competing or an adverse interest in the transaction.

3. The method of claim 2, wherein
- an access of the first user encompasses both the first and the second change sets, and
- an access of the second user is limited to the second change set.

4. The method of claim 1, wherein the first user and the second user are on a common side of the transaction.

5. The method of claim 1, wherein the predefined user selection is made by a third user having responsibility for approving edits by the first user or the second user.

6. The method of claim 1, wherein merging the portion of the first change set with the portion of the second change set includes:
- when the merging does not result in a conflict,
  - merging, without user intervention, the portion of the first change set with the portion of the second change set; and
- when the merging does result in a conflict between edits in the portion of the first change set and the edits in the portion of the second change set,
  - requesting a user to resolve the conflict.

7. The method of claim 1, wherein merging the portion of the first change set with the portion of the second change set includes:
- when the merging does not result in a change of semantics of the master instance of the hierarchical data structure,
  - merging, without user intervention, the portion of the first change set with the portion of the second change set; and
- when the merging does result in a change of semantics of the master hierarchical data structure,
  - requesting a user to accept or reject the change of semantics.

8. The method of claim 1, wherein the transaction includes one of: an IPO transaction, a merger or acquisition transaction, a rights issue transaction, a debt issuance transaction, or a security related transaction.

9. The method of claim 1, wherein content of the master instance of the hierarchical data structure does not change.

10. The method of claim 1, wherein the hierarchical data structure further includes one or more sections, and each section in the one or more sections includes one or more structural elements in the plurality of structural elements.

11. The method of claim 1, wherein a structural element in the plurality of structural elements corresponds to a paragraph having one or more text or non-text elements in the hierarchical data structure.

12. The method of claim 1, wherein the applying one or more edits included in the third change set to the plurality of structural elements included in the master instance of the hierarchical data structure comprises:
- incorporating, into the hierarchical data structure, some, but not all, edits in the one or more edits.

13. The method of claim 1, wherein the respective secondary instance of the hierarchical data structure is associated with a compliance checklist, and wherein
- the compliance checklist includes one or more compliance items associated with a portion of the respective secondary instance of the hierarchical data structure, and
- the one or more compliance items correspond to one or more requirements that need to be fulfilled before completing the transaction.

14. The method of claim 13, further comprising:
- updating, without user intervention, the compliance checklist in accordance with a change to the portion of the respective secondary instance of the hierarchical data structure.

15. The method of claim 1, wherein the respective secondary instance of the hierarchical data structure is associated with a verification checklist, and wherein
- the verification checklist includes information identifying one or more documents associated with a portion of the respective secondary instance of the hierarchical data structure, and
- the one or more documents verify, as deemed by a user, the portions of the hierarchical data structure.

16. The method of claim 15, wherein the verification includes, in accordance with a determination that a respective portion of the one or more portions of the hierarchical data structure constitutes an assertion of fact or is based on an explicit or implicit assumption of fact, confirming accuracy of the assertion or the assumption of fact using the one or more documents.

17. The method of claim 15, further comprising:
- updating, without user intervention, the verification checklist in accordance with a change to the portion of the respective secondary instance of the hierarchical data structure.

18. A computer system, comprising:
- one or more processors;
- memory storing one or more programs for execution by the one or more processors, the one or more programs including instructions for:
  - formatting for display a hierarchical data structure associated with a transaction, wherein the hierarchical data structure comprises a plurality of structural elements within a single first document;
  - spawning, from a first sub-node in a plurality of sub-nodes to a second sub-node in the plurality of sub-nodes, a branch in a directed acyclic graph, the directed acyclic graph including: (a) a root node corresponding to a master instance of the hierarchical data structure, (b) the plurality of sub-nodes, and (c) a plurality of branches, wherein each sub-node in the plurality of sub-nodes corresponds to an edited version of the hierarchical data structure in a plurality of edited versions of the hierarchical data structure in a respective edited version of the single first document and wherein a respective sub-node in the plurality of sub-nodes is connected with another sub-node in the plurality of sub-nodes by at least one branch in the plurality of branches, wherein a respective edited version in the plurality of edited versions of the hierarchical data structure is associated with (a) a respective secondary instance of the hierarchical data structure, and (b) a respective change set corresponding to the secondary instance, and wherein the respective change set includes one or more edits, by a user associated with the respective edited version of the hierarchical data structure, to the hierarchical data structure;

obtaining (a) a first change set associated with a first edited version of the hierarchical data structure, wherein the first change set is also associated with the first sub-node and includes one or more edits, by a user associated with the first edited version of the hierarchical data structure, and (b) a second change set associated with a second edited version of the hierarchical data structure, wherein the second change set is associated with a third sub-node in the plurality of sub-nodes, the third sub-node having at least one common ancestor node with the first sub-node in the directed acyclic graph, and wherein the first change set is associated with a first user and the second change set is associated with a second user and wherein the first edited version and the second edited version are in the plurality of edited versions; and responsive to a predefined user selection:
merging a portion of the first change set with a portion of the second change set to produce a third change set while retaining the first change set and the second change set,
generating an additional secondary instance of the hierarchical data structure by applying one or more edits included in the third change set to the plurality of structural elements included in the master instance of the hierarchical data structure,
associating the additional secondary instance of the hierarchical data structure with an edited version of the hierarchical data structure, and
associating the edited version of the hierarchical data structure with the second sub-node in the directed acyclic graph.

19. The system of claim 18, wherein the first user and the second user have a competing or an adverse interest in the transaction.

20. The system of claim 18, wherein
an access of the first user encompasses both the first and the second change sets, and
an access of the second user is limited to the second change set.

21. The system of claim 18, wherein the first user and the second user are on a common side of the transaction.

22. The system of claim 18, wherein the predefined user selection is made by a third user having responsibility of approving edits by the first user or the second user.

23. The system of claim 18, wherein the instructions for merging the portion of the first change set with the portion of the second change set include instructions for:
when the merging does not result in a conflict,
merging, without user intervention, the portion of the first change set with the portion of the second change set; and
when the merging does result in a conflict between edits in the portion of the first change set and the edits in the portion of the second change set,
requesting a user to resolve the conflict.

24. The system of claim 18, wherein the instructions for merging the portion of the first change set with the portion of the second change set include instructions for:
when the merging does not result in a change of semantics of the hierarchical data structure,
merging, without user intervention, the portion of the first change set with the portion of the second change set; and
when the merging does result in a change of semantics of the hierarchical data structure,
requesting a user to accept or reject the change of semantics.

25. The system of claim 18, wherein the transaction includes one of: an IPO transaction, a merger or acquisition transaction, a rights issue transaction, a debt issuance transaction, or a security related transaction.

26. The system of claim 18, wherein content of the master instance of the hierarchical data structure does not change.

27. The system of claim 18, wherein the hierarchical data structure further includes one or more sections, and each section in the one or more sections includes one or more structural elements in the plurality of structural elements.

28. The system of claim 18, wherein a respective structural element in the plurality of structural elements corresponds to a paragraph having one or more text or non-text elements in the hierarchical data structure.

29. The system of claim 18, wherein the instructions for applying one or more edits included in the third change set to the plurality of structural elements included in the master instance of the hierarchical data structure include instructions for:
incorporating, into the hierarchical data structure, some, but not all, edits in the one or more edits.

30. The system of claim 18, wherein the respective secondary instance of the hierarchical data structure is associated with a compliance checklist, wherein
the compliance checklist includes one or more compliance items associated with a portion of the respective secondary instance of the hierarchical data structure, and
the one or more compliance items correspond to one or more requirements that need to be fulfilled before completing the transaction.

31. The system of claim 30, wherein the one or more programs further comprise instructions for:
updating, without user intervention, the compliance checklist in accordance with a change to the portion of the respective secondary instance of the hierarchical data structure.

32. The system of claim 18, wherein the respective secondary instance of the hierarchical data structure is associated with a verification checklist, wherein the verification checklist includes information identifying one or more documents associated with a portion of the secondary instance of the hierarchical data structure, and the one or more documents verify, as deemed by a user, the portions of the hierarchical data structure.

33. The system of claim 32, wherein the verification includes:

in accordance with a determination that a respective portion of the one or more portions of the hierarchical data structure constitutes an assertion of fact or is based on an explicit or implicit assumption of fact: confirming accuracy of the assertion or the assumption of fact using the one or more documents.

34. The system of claim 32, wherein the one or more programs further comprise instructions for:

updating, without user intervention, the verification checklist in accordance with a change to the portion of the respective secondary instance of the hierarchical data structure.

35. A non-transitory computer readable storage medium storing one or more programs for execution by the one or more processors of a computer system, the one or more programs including instructions for:

formatting for display a hierarchical data structure associated with a transaction, wherein the hierarchical data structure comprises a plurality of structural elements within a single first document;

spawning, from a first sub-node in a plurality of sub-nodes to a second sub-node in the plurality of sub-nodes, a branch in a directed acyclic graph, the directed acyclic graph including: (a) a root node corresponding to a master instance of the hierarchical data structure, (b) the plurality of sub-nodes, and (c) a plurality of branches, wherein each respective sub-node in the plurality of sub-nodes corresponds to an edited version of the hierarchical data structure in a plurality of edited versions of the hierarchical data structure in a respective edited version of the single first document, and wherein a respective sub-node in the plurality of sub-nodes is connected with another sub-node in the plurality of sub-nodes by at least one branch in the plurality of branches, wherein a respective edited version in the plurality of edited versions of the hierarchical data structure is associated with (a) a respective secondary instance of the hierarchical data structure, and (b) a respective change set corresponding to the secondary instance, and the respective change set includes one or more edits, by a user associated with the respective edited version of the hierarchical data structure, to the hierarchical data structure;

obtaining (a) a first change set associated with a first edited version of the hierarchical data structure, wherein the first change set is also associated with the first sub-node and includes one or more edits, by a user associated with the first edited version of the hierarchical data structure, and (b) a second change set associated with a second edited version of the hierarchical data structure, wherein the second change set is associated with a third sub-node in the plurality of sub-nodes, the third sub-node having at least one common ancestor node with the first sub-node in the directed acyclic graph, and wherein the first change set is associated with a first user and the second change set is associated with a second user and wherein the first edited version and the second edited version are in the plurality of edited versions; and responsive to a predefined user selection:

merging a portion of the first change set with a portion of the second change set to produce a third change set while retaining the first change set and the second change set, generating an additional secondary instance of the hierarchical data structure by applying one or more edits included in the third change set to the plurality of structural elements included in the master instance of the hierarchical data structure, associating the secondary instance of the hierarchical data structure with an edited version of the hierarchical data structure, and associating the edited version of the hierarchical data structure with the second sub-node in the directed acyclic graph.

36. The non-transitory computer readable storage medium of claim 35, wherein the first user and the second user have a competing or an adverse interest in the transaction.

37. The non-transitory computer readable storage medium of claim 36, wherein an access of the first user encompasses both the first and the second change sets, and an access of the second user is limited to the second change set.

38. The non-transitory computer readable storage medium of claim 35, wherein the first user and the second user are on a common side of the transaction.

39. The non-transitory computer readable storage medium of claim 35, wherein the predefined user selection is made by a third user having responsibility of approving edits by the first or the second user.

40. The non-transitory computer readable storage medium of claim 35, wherein the instructions for merging the portion of the first change set with the portion of the second change set include instructions for:

when the merging does not result in a conflict,
merging, without user intervention, the portion of the first change set with the portion of the second change set; and when the merging does result in a conflict between edits in the portion of the first change set and the edits in the portion of the second change set,
requesting a user to resolve the conflict.

41. The non-transitory computer readable storage medium of claim 35, wherein the instructions for merging the portion of the first change set with the portion of the second change set include instructions for:

when the merging does not result in a change of semantics of the hierarchical data structure,
merging, without user intervention, the portion of the first change set with the portion of the second change set; and when the merging does result in a change of semantics of the hierarchical data structure,
requesting a user to accept or reject the change of semantics.

42. The non-transitory computer readable storage medium of claim 35, wherein the transaction includes one of: an IPO transaction, a merger or acquisition transaction, a rights issue transaction, a debt issuance transaction, or a security related transaction.

43. The non-transitory computer readable storage medium of claim 35, wherein content of the master instance of the hierarchical data structure does not change.

44. The non-transitory computer readable storage medium of claim 35, wherein the hierarchical data structure further includes one or more sections, and each section in the one or more sections includes one or more structural elements in the plurality of structural elements.

45. The non-transitory computer readable storage medium of claim 35, wherein a respective structural element in the plurality of structural element corresponds to a paragraph having one or more text or non-text elements in the hierarchical data structure.

46. The non-transitory computer readable storage medium of claim 35, wherein the instructions for applying one or more edits included in the third change set to the plurality of structural elements included in the master instance of the hierarchical data structure include instructions for:
   incorporating, into the hierarchical data structure, some, but not all, edits in the one or more edits.

47. The non-transitory computer readable storage medium of claim 35, wherein the respective secondary instance of the hierarchical data structure is associated with a compliance checklist, wherein
   the compliance checklist includes one or more compliance items associated with a portion of the secondary instance of the hierarchical data structure, and
   the one or more compliance items correspond to one or more requirements that needs to be fulfilled before completing the transaction.

48. The non-transitory computer readable storage medium of claim 47, wherein the one or more programs further comprise instructions for:
   updating, without user intervention, the compliance checklist in accordance with a change to the portion of the secondary instance of the hierarchical data structure.

49. The non-transitory computer readable storage medium of claim 35, wherein the secondary instance of the hierarchical data structure is associated with a verification checklist, wherein
   the verification checklist includes information identifying one or more documents associated with a portion of the secondary instance of the hierarchical data structure, and
   the one or more documents verify, as deemed by a user, the portions of the hierarchical data structure.

50. The non-transitory computer readable storage medium of claim 49, wherein the verification includes, in accordance with a determination that a respective portion of the one or more portions of the hierarchical data structure constitutes an assertion of fact or is based on an explicit or implicit assumption of fact, confirming accuracy of the assertion or the assumption of fact using the one or more documents.

51. The non-transitory computer readable storage medium of claim 49, wherein the one or more programs further comprise instructions for:
   updating, without user intervention, the verification checklist in accordance with a change to the portion of the respective secondary instance of the hierarchical data structure.

* * * * *